United States Patent
Gil et al.

(10) Patent No.: US 12,222,386 B2
(45) Date of Patent: Feb. 11, 2025

(54) METHOD OF GENERATING DEVICE MODEL AND COMPUTING DEVICE PERFORMING THE SAME

(71) Applicant: Samsung Electronics Co., Ltd., Suwon-si (KR)

(72) Inventors: Gwangnae Gil, Yongin-si (KR); Seyoung Park, Hwaseong-si (KR); Sola Woo, Gwacheon-si (KR); Jonghyun Lee, Daegu (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 336 days.

(21) Appl. No.: 17/899,101

(22) Filed: Aug. 30, 2022

(65) Prior Publication Data
US 2023/0194594 A1 Jun. 22, 2023

(30) Foreign Application Priority Data

Dec. 17, 2021 (KR) .................. 10-2021-0181283
Jan. 28, 2022 (KR) .................. 10-2022-0013195

(51) Int. Cl.
G01R 31/28 (2006.01)
G05B 13/02 (2006.01)

(52) U.S. Cl.
CPC ..... *G01R 31/2851* (2013.01); *G05B 13/0265* (2013.01)

(58) Field of Classification Search
CPC ... G01R 31/2851; G06F 30/367; G06F 30/27; G06F 2111/06; G06F 2111/10; G05B 13/0265
See application file for complete search history.

(56) References Cited

U.S. PATENT DOCUMENTS

| | | |
|---|---|---|
| 7,031,780 B2 | 4/2006 | Kerzendorf et al. |
| 7,734,555 B2 | 6/2010 | Lee et al. |
| 8,457,388 B2 | 6/2013 | Chen et al. |

(Continued)

FOREIGN PATENT DOCUMENTS

KR 100820723 B1 4/2008

*Primary Examiner* — An H Do
(74) *Attorney, Agent, or Firm* — Harness, Dickey & Pierce, P.L.C.

(57) ABSTRACT

Measurement data are produced by measuring characteristics of a semiconductor device. Target parameters are selected among a plurality of parameters of a device model where the device model is configured to perform a simulation based on device data and output simulation result data indicating the characteristics of the semiconductor device. Initial value sets corresponding to different combinations of initial values of the target parameters are selected. Local minimum values are determined based on reinforcement learning. Each local minimum value corresponds to a minimum value of a difference between the measurement data and the simulation result data with respect to each initial value set. Optimal values of the target parameters are determined based on the plurality of local minimum values. The device model capable of precisely predicting characteristics of the semiconductor device is generated by determining the parameters of the device model using the optimization scheme based on the reinforcement learning.

20 Claims, 30 Drawing Sheets

(56) References Cited

U.S. PATENT DOCUMENTS

| | | | | |
|---|---|---|---|---|
| 8,676,547 B2* | 3/2014 | Seki | ..................... | G06F 30/367 |
| | | | | 703/2 |
| 8,713,489 B2* | 4/2014 | Higuchi | .................. | G06F 30/20 |
| | | | | 700/109 |
| 10,235,600 B2 | 3/2019 | Vidal et al. | | |
| 10,747,916 B2* | 8/2020 | Reid | ..................... | G06F 30/367 |
| 11,982,980 B2* | 5/2024 | Kim | ..................... | G05B 13/042 |
| 2008/0155444 A1 | 6/2008 | Pannese et al. | | |
| 2008/0319558 A1 | 12/2008 | Resende et al. | | |
| 2010/0169256 A1 | 7/2010 | Lee et al. | | |
| 2021/0141947 A1 | 5/2021 | Sharpe et al. | | |

\* cited by examiner

FIG. 7

| SP | PGC | PT | PG | PR | CM |
|---|---|---|---|---|---|
| SP1 | CB1 | PT1 | PG1 | PR1 | CM1 |
| SP2 | CB2 | PT1 | PG2 | PR2 | CM2 |
| SP3 | CB3 | PT1 | PG3 | PR3 | CM3 |
| SP4 | CB4 | PT2 | PG1 | PR4 | CM4 |
| SP5 | CB5 | PT2 | PG2 | PR5 | CM5 |
| SP6 | CB6 | PT2 | PG3 | PR6 | CM6 |
| SP7 | CB7 | PT3 | PG1 | PR7 | CM7 |
| SP8 | CB8 | PT3 | PG3 | PR8 | CM8 |

⋮

| DEVICE DATA(DV) | PROCESS DATA(PR) | SIMULATION RESULT DATA(SR) |
|---|---|---|
| W | $D_k$ | $V_t$ |
| L | $D_d$ | G |
| $T_{op}$ | $T_{act}$ | $V_{bk}$ |
| $V_d$ | tOG | $I_d$ |
| $V_g$ | tSP | |
| $V_b$ | | |
| $V_s$ | | |

FIG. 13

| IVS | RL | |
|---|---|---|
| IV1 | Pt1 | (PV1,LM1) |
| IV2 | Pt2 | (PV2,LM2) |
| IV3 | Pt3 | (PV3,LM3) |
| IV4 | Pt4 | (PV4,LM4) |
| IV5 | Pt5 | (PV5,LM5) |

FIG. 16

| IVS | RL | | RL+GA | |
|-----|-----|-----|-----|-----|
| | Pt1 | (PV1, LM1) | Pt1' | (PV1', GM1) |
| IV1 | Pt2 | (PV2, LM2) | Pt2' | (PV2', GM2) |
| IV2 | Pt3 | (PV3, LM3) | Pt3' | (PV3', GM3) |
| IV3 | Pt4 | (PV4, LM4) | Pt4' | (PV4', GM4) |
| IV4 | Pt5 | (PV5, LM5) | Pt5' | (PV5', GM5) |
| IV5 | | | | |

FIG. 21

| CANDIDATE ACTION | ($\Delta p1, \Delta p2, \Delta p3$) |
|---|---|
| CAC1 | (0,0,0) |
| CAC2 | (0,0,1) |
| CAC3 | (0,1,0) |
| CAC4 | (1,0,0) |
| CAC5 | (0,1,1) |
| CAC6 | (1,0,1) |
| CAC7 | (1,1,0) |
| CAC8 | (1,1,1) |

FIG. 25

| ET | DV |
|---|---|
| Idsat | Vds = Vgs = 1.2 V |
| Idsat2 | Vds = 1.2V, Vgs = 0.6V |
| Idmid | Vds = 0.4V, Vgs = 1.2V |
| Idmid2 | Vds = 0.6V, Vgs = 0.6V |
| Idlin | Vds = 0.05V, Vgs = 1.2V |
| Idoff | Vds = 1.2V, Vgs = 0.0V |

FIG. 26

| ET | MD | 0 | 1 | 2 | ... | 11 | 12 | 13 |
|---|---|---|---|---|---|---|---|---|
| Idsat | 505.8 | 520.2562 | 505.7834 | 511.6233 | | 507.8147 | 505.5295 | 506.7991 |
| Idsat2 | 88.525 | 88.71676 | 87.09915 | 89.76716 | | 89.03188 | 91.88897 | 85.73363 |
| Idmid | 381.45 | 381.8767 | 385.6853 | 381.8767 | | 370.9586 | 376.7985 | 376.7985 |
| Idmid2 | 66.185 | 65.67099 | 64.53656 | 67.45667 | | 65.75503 | 62.83491 | 67.16256 |
| Idlin | 69.17 | 72.16047 | 76.52768 | 73.35383 | | 75.05501 | 75.05501 | 69.54522 |
| Idoff | 0.005556 | 0.0205 | 0.012581 | 0.020216 | | 0.013186 | 0.012812 | 0.011878 |

FIG. 27

| ET | MD | RL + GA |
|---|---|---|
| Idsat | 505.8 | 508.5764256 |
| Idsat2 | 88.525 | 88.73777202 |
| Idmid | 381.45 | 379.3375835 |
| Idmid2 | 66.185 | 67.28860885 |
| Idlin | 69.17 | 69.26592556 |
| Idoff | 0.005556 | 1.004278605 |

METHOD OF GENERATING DEVICE MODEL AND COMPUTING DEVICE PERFORMING THE SAME

CROSS-REFERENCE TO RELATED APPLICATION

This U.S. non-provisional application claims priority under 35 USC § 119 to Korean Patent Application No. 10-2021-0181283 filed on Dec. 17, 2021 and Korean Patent Application No. 10-2022-0013195 filed on Jan. 28, 2022, in the Korean Intellectual Property Office (KIPO), the disclosures of which are incorporated by reference herein in their entirety.

BACKGROUND

1. Technical Field

Example embodiments relate generally to semiconductor integrated circuits, and more particularly to a method of generating a device model using an improvement and/or optimization scheme and a computing device performing the method.

2. Discussion of the Related Art

With development of the electronics industry, the design technology co-optimization (DTCO), in which the design of a semiconductor product is checked based on the available of manufacturing processes, is increasingly important. For example, in the foundry industry, a manufacturer may provide a device model corresponding to a target process level and a designer may design and simulate the semiconductor product using the device model. However, a change of the target process level may lead to a change of the device model. In this case, the designer has to change the established design, which may take an impractical and/or an enormous amount of time to newly perform a simulation based on the changed design, and accordingly, extra cost may be incurred to the manufacture and/or time loss may be incurred to the designer. Moreover, if the accuracy of a model performing the simulation is low, the performance of designed and manufactured product may be degraded due to inaccurate prediction of the characteristics of the semiconductor device.

SUMMARY

Some example embodiments may provide a method of generating a device model and a computing device performing the method, capable of precisely predicting characteristics of semiconductor devices.

According to example embodiments, a method of generating a device model configured to perform a simulation based on device data and output simulation result data indicating characteristics of a semiconductor device. The method is performed by at least one processor executing program codes and comprises receiving measurement data obtained by measuring the characteristics of the semiconductor device; selecting at least one target parameter from a plurality of parameters of the device model configured to perform the simulation; selecting a plurality of initial value sets corresponding to different combinations of initial values of the at least one target parameter; determining a plurality of local minimum values based on reinforcement learning such that each of the plurality of local minimum values corresponds to a minimum value of a difference between the measurement data and the simulation result data with respect to each of the plurality of initial value sets; and determining improved values of the at least one target parameter based on the plurality of local minimum values.

According to example embodiments, a method of generating a device model configured to perform a simulation based on device data and output simulation result data indicating characteristics of a semiconductor device. The method is performed by at least one processor executing program codes and comprises receiving measurement data obtained by measuring characteristics of the semiconductor device; selecting at least one target parameters among a plurality of parameters of the device model configured to perform the simulation; selecting a plurality of initial value sets corresponding to different combinations of initial values of the at least one target parameter; determining a plurality of local minimum values based on reinforcement learning such that each of the plurality of local minimum values corresponds to a minimum value of a difference between the measurement data and the simulation result data with respect to each of the plurality of initial value sets; performing a genetic algorithm such that a plurality of global minimum values equal to or smaller than the plurality of local minimum values is determined; and determining improved values of the at least one target parameter based on the plurality of global minimum values.

According to example embodiments, a computing device includes a computer readable medium storing program codes including a training control module configured to train a device model, the device model configured to perform a simulation based on device data and output simulation result data indicating characteristics of a semiconductor device; and at least one processor configured to, by executing the training control module, receive measurement data obtained by measuring the characteristics of the semiconductor device; select at least one target parameter among a plurality of parameters of the device model; select a plurality of initial value sets corresponding to different combinations of initial values of the at least one target parameter; determine a plurality of local minimum values based on reinforcement learning such that each of the plurality of local minimum value corresponds to a minimum value of a difference between the measurement data and the simulation result data with respect to each of the plurality of initial value sets; and determine improved values of the at least one target parameters based on the plurality of local minimum values.

The method of generating a device model and the computing system according to example embodiments may provide a device model capable of precisely predicting characteristics of the semiconductor device by determining the parameters of the device model using the optimization scheme based on the reinforcement learning.

Through the enhanced prediction performance of the device model, the time and/or the cost of designing and/or manufacturing the semiconductor product including the semiconductor device and the performance of the semiconductor product may be enhanced.

BRIEF DESCRIPTION OF THE DRAWINGS

Example embodiments of the present disclosure will be more clearly understood from the following detailed description taken in conjunction with the accompanying drawings.

FIGS. 6, 7 and 8 are diagrams for describing a plurality of device models to which a method of generating a device model according to some example embodiments may be applied.

FIGS. 12 and 13 are diagrams for describing the example of determining optimal values of FIG. 11.

FIGS. 15 and 16 are diagrams for describing the example of determining optimal values of FIG. 14.

FIG. 21 is a diagram illustrating an example of candidate actions by the reinforcement learning module of FIG. 17.

FIG. 25 is a diagram illustrating an example device data corresponding to the reference points of FIG. 24.

FIGS. 26, 27 and 28 are diagrams illustrating results of a method of generating a device model according to some example embodiments to the reference points of FIG. 24.

DETAILED DESCRIPTION OF THE EMBODIMENTS

Figure 1:
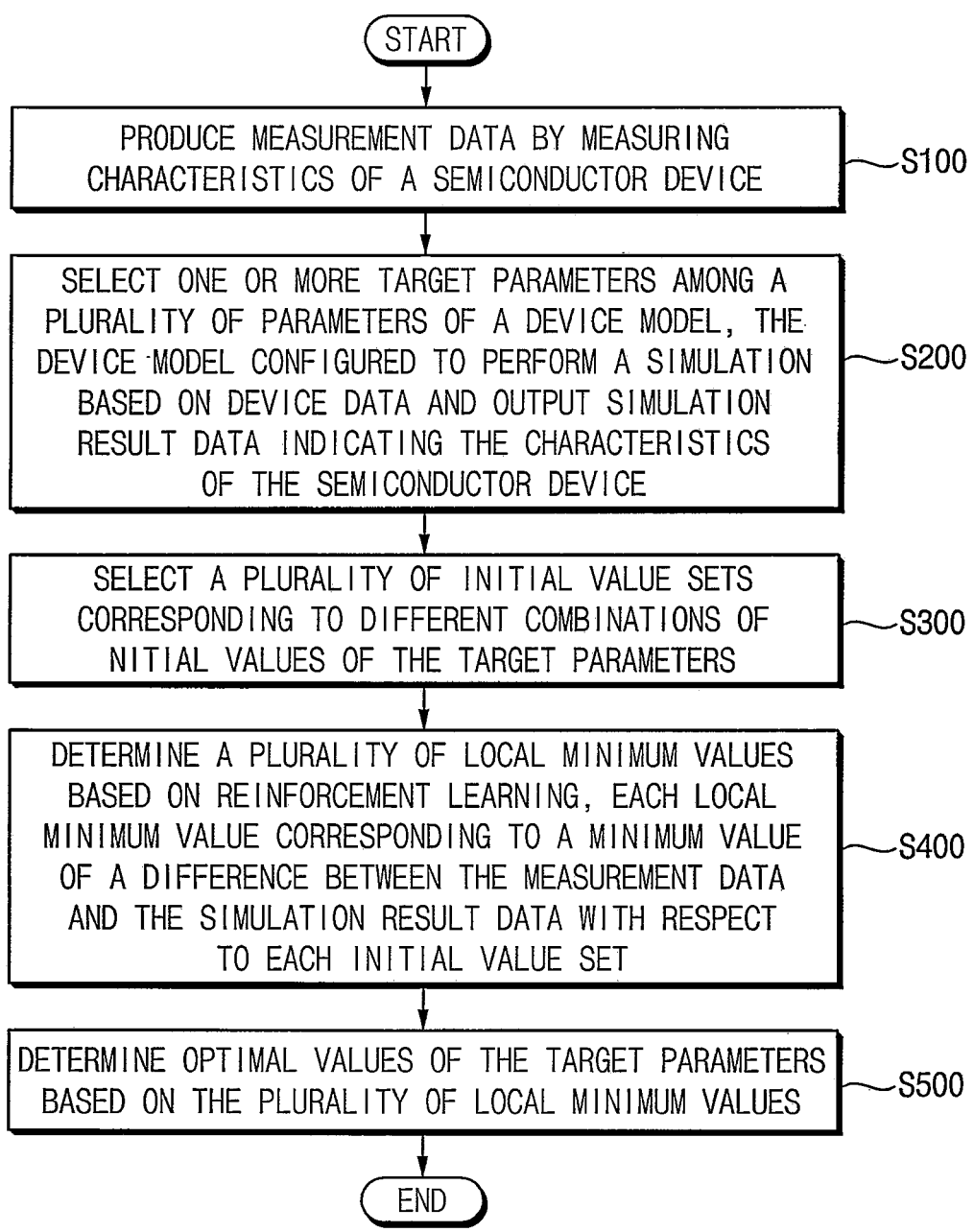
FIG. 1 is a flowchart illustrating a method of generating a device model according to some example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a method of generating a device model according to some example embodiments. The method of FIG. 1 may be performed, e.g., by at least one processor executing program codes that are stored in computer readable media.

Referring to FIG. 1, measurement data may be produced by measuring characteristics of a semiconductor device (S100).

The measurement data may be provided using semiconductor measuring equipment, as will be described below with reference to FIG. 5. For example, test element groups on a wafer may be measured and this provided as the measurement data. In some example embodiments, the test element groups may be scribe lanes on a semiconductor wafer.

One or more target parameters may be selected among a plurality of parameters of a device model where the device model is configured to perform a simulation based on device data and output simulation result data indicating the characteristics of the semiconductor device (S200). A plurality of initial value sets corresponding to different combinations of initial values of the target parameters may be selected (S300).

As will be described below with reference to FIGS. 6 and 7, the device model may be one of a plurality of compact models respectively corresponding to a plurality of process data and a plurality of semiconductor products. In some example embodiments, a compact model may output, as the simulation result data, a drain current of a transistor corresponding to operation voltages (such as a gate voltage, a drain voltage and/or the like) among device data input to the compact model. In these cases, current-voltage curves as will be described below with reference to FIG. 24 may be generated based on drain currents output from the compact model by changing the operation voltages input to the compact model.

The target parameters, initial values of the inputs, and/or the initial values of the target parameters may be selected randomly. In some example embodiments, specific target parameter may be selected based on target characteristics of the semiconductor device.

A plurality of local minimum values may be determined based on reinforcement learning where each local minimum value corresponds to a minimum value of a difference between the measurement data and the simulation result data with respect to each initial value set (S400).

Reinforcement learning indicates a method of training a neural network based on rewards obtained by performing actions under unknown environments. For example, artificial intelligence (AI) may enhance its performance through deep reinforcement learning. Deep reinforcement learning indicates a technology such that deep learning is applied to the reinforcement learning. Deep reinforcement learning is a form of Q-value approximation to which a deep neural network is applied. Whereas a p-value is an area under the tail of a distribution that indicates the likelihood of a result happening by chance, a Q-value is a form of p-value which is adjusted for the false discovery rate (the proportion of false positives to be expected from a test). The Q-value indicates a reward that is predicted when an action is performed, e.g., under a specific state. The deep neural network applied to the Q-value approximation is referred to as a deep Q network (DQN).

The deep reinforcement learning may be implemented by interaction of an agent and an environment. The agent may select an action corresponding to the highest reward that is predicted, and the state is changed by the action. The environment may provide, as the Q-value, the reward that is predicted for each action in the changed state.

Example embodiments apply the deep reinforcement learning to optimize values of the parameters of a device model such as a compact model by rapidly and efficiently determining a local minimum value (e.g., a difference between the measurement data and the simulation result data). In this disclosure, values of target parameters correspond to the state of the deep reinforcement learning and change of the values of target parameters corresponds to the action of the deep reinforcement learning.

Optimal values of the target parameters may be determined based on the plurality of local minimum values (S500).

In some example embodiments, as will be described below with reference to FIGS. 11, 12 and 13, a selection local minimum value corresponding to a minimum value may be determined among the plurality of local minimum values, and values of the target parameters corresponding to the selection local minimum value may be determined as the optimal values. In some example embodiments, as will be described below with reference to FIGS. 14, 15 and 16, a genetic algorithm may be further performed to determine the optimal values of the target parameters.

Figure 2:
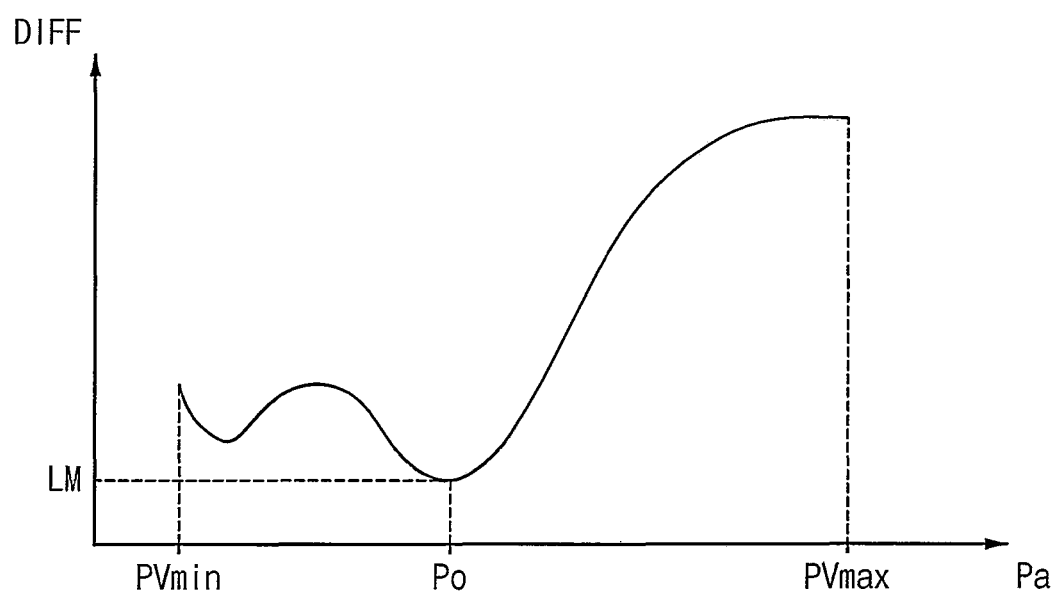
FIGS. 2 and 3 are diagrams for describing a method of determining a minimum value to improve and/or optimize a device model.
Figure 3:
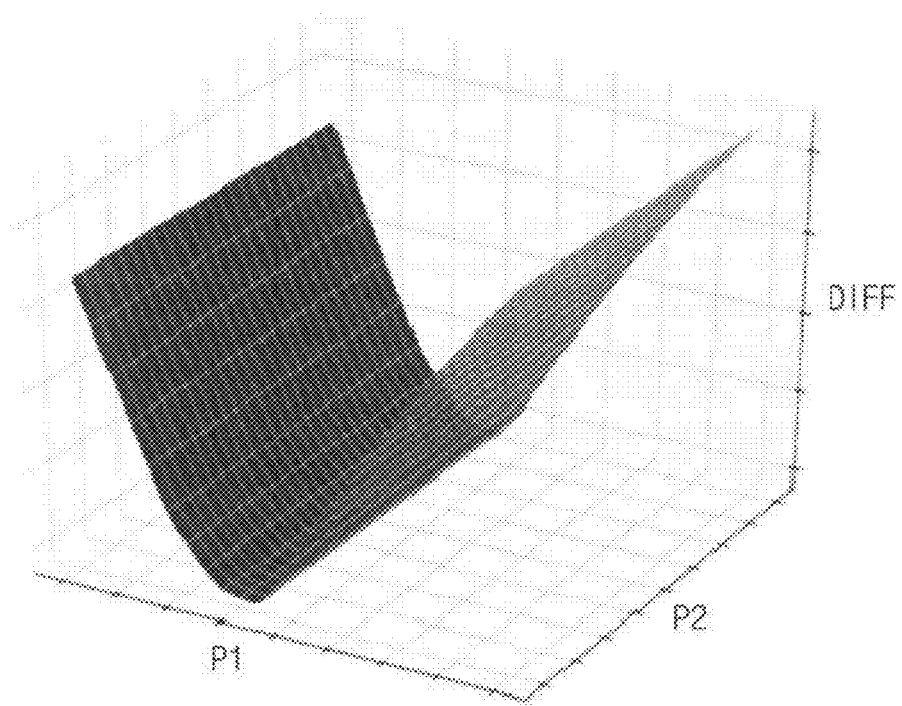

FIGS. 2 and 3 are diagrams for describing a method of determining a minimum value to improve and/or optimize a device model.

FIG. 2 illustrates an example distribution of a difference DIFF between measurement data and simulation result data when one target parameter Pa is selected, and FIG. 3 illustrates an example distribution of a difference DIFF between measurement data and simulation result data when two target parameters P1 and P2 are selected.

The parameters defining the device model have complex relationship and there is no general solution to obtain optimal values of the parameters. As illustrated in FIG. 2, an optimal value Po of the target parameter Pa corresponding to a local minimum value LM may be searched by changing the value of the parameter Pa from a minimum value PVmin to a maximum value PVmax. However, such method may take too much time, and the search time of the local minimum value increases significantly as the number of the target parameters increases as FIG. 3.

According to example embodiments, the device model capable of precisely predicting characteristics of the semiconductor device may be provided by determining the parameters of the device model using the optimization scheme based on the reinforcement learning.

Figure 4:
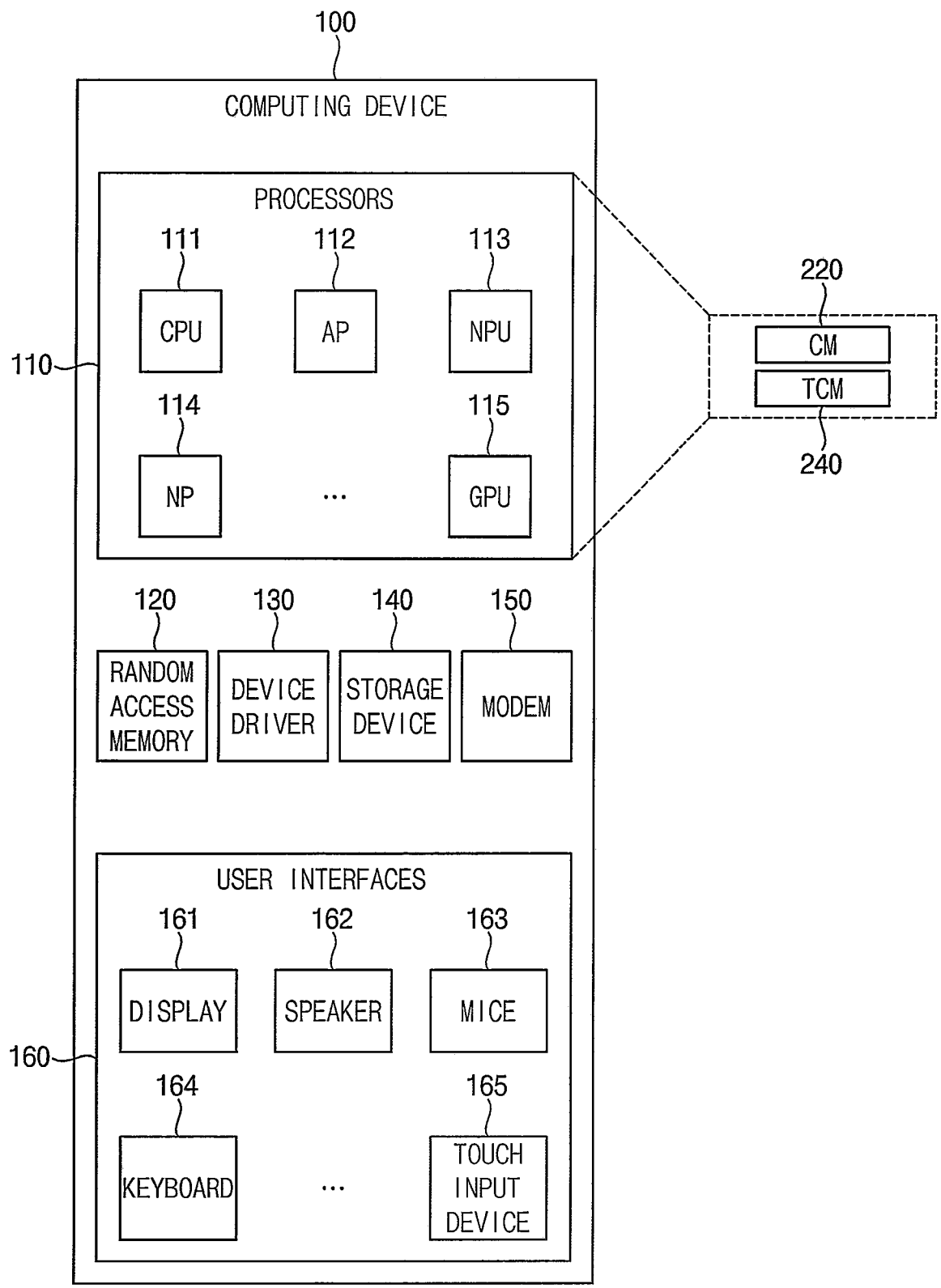
FIG. 4 is a block diagram illustrating a computing device according to some example embodiments.

FIG. 4 is a block diagram illustrating a computing device according to some example embodiments.

Referring to FIG. 4, a computing device 100 may include processors 110, a random access memory 120, a device driver 130, a storage device 140, a modem 150, and a user interface 160.

At least one processor of the processors 110 may be configured to execute a training control module TCM 240 configured to generate a device model CM 220. The training control module 240 may perform the method of FIG. 1 to optimize the parameters of the device model 220.

In some example embodiments, the device model 220 and the training control module 240 may be implemented as instructions (and/or program codes) that may be executed by the at least one of the processors 110. The instructions (and/or program codes) of the device model 220 and the training control module 240 may be stored in computer readable media. For example, the at least one processor may load (and/or read) the instructions to (and/or from) the random access memory 120 and/or the storage device 140.

In some example embodiments, the at least one processor may be manufactured to efficiently execute instructions included in the device model 220 and the training control module 240. The at least one processor may receive information corresponding to the device model 220 and the training control module 240 to operate the device model 220 and the training control module 240.

The processors 110 may include, for example, at least one general-purpose processor such as a central processing unit (CPU) 111, an application processor (AP) 112, and/or other processing units. In addition, the processors 110 may include at least one special-purpose processor such as a neural processing unit (NPU) 113, a neuromorphic processor (NP) 114, a graphic processing unit (GPU) 115, etc. For example, the processors 110 may include two or more heterogeneous processors. Though the processors 110 are illustrated as including the CPU 111, AP 112, NPU 113, NP 114, and GPU 115, the example embodiments are not so limited. For example, the processors 110 may include more or fewer processors than illustrated.

The random access memory 120 may be used as an operation memory of the processors 110, a main memory, and/or a system memory of the computing device 100. The random access memory 120 may include a volatile memory such as a dynamic random access memory (DRAM), a static random access memory (SRAM), and/or the like. Additionally (and/or alternatively), the random access memory 120 may include a nonvolatile memory such as a phase-change random access memory (PRAM), a ferroelectrics random access memory (FRAM), a magnetic random access memory (MRAM), a resistive random access memory (RRAM), and/or the like.

The device driver 130 may control peripheral circuits such as the storage device 140, the modem 150, the user interface 160, etc., according to requests of the processors 110. The storage device 140 may include a fixed storage device such as a hard disk drive, a solid state drive (SSD), etc., and/or include (and/or be connected to) an attachable storage device such as an external hard disk drive, an external SSD, a memory card, and/or other external storage.

The modem 150 may perform wired and/or wireless communication with external devices through various communication methods and/or communication interface protocols such as Ethernet, WiFi, LTE, a third generation communication system such as code division multiple access (CDMA), global system for mobile communications (GSM), north American digital cellular (NADC), extended-time division multiple access (E-TDMA), and/or wide band code division multiple access (WCDMA), a fourth generation communication system such as 4G LTE, a fifth generation communication system such as 5G mobile communication, and/or other communication methods.

The user interface 160 may receive information from a user and/or provide information to the user. The user interface 160 may include at least one output interface such as a display 161, a speaker 162, etc., and may further include at least one input interface such as mice (or a mouse) 163, a keyboard 164, a touch input device 165, etc. Though illustrated as including the display 161, the speaker 162, the mice 163, the keyboard 164, and the touch input device 165, the example embodiments are not so limited, and may, e.g., include more or fewer elements. In some example embodiments, for example, some of the user interfaces 160 may be combined (e.g., to include a touch screen and/or the like).

In some example embodiments, the device model 220 and the training control module 240 may receive the instructions (and/or program codes) through the modem 150 and store the instructions in the storage device 150. In some example embodiments, the instructions of the device model 220 and the training control module 240 may be stored in an attachable storage device and the attachable storage device may be connected to the computing device 100 by a user. The instructions of the device model 220 and the training control module 240 may be loaded in the random access memory 120 for rapid execution of the instructions.

In some example embodiments, at least one of the computer program codes, the device model, the deep learning model and/or the training control module may be stored in a transitory and/or non-transitory computer-readable medium. In some example embodiments, values resulting from a simulation performed by the processor and/or values obtained from arithmetic processing performed by the processor may be stored in a transitory and/or non-transitory computer-readable medium. In some example embodiments, intermediate values generated during deep learning may be stored in a transitory and/or non-transitory computer-readable medium. In some example embodiments, at least one of the process data, the device data, the simulation result data, the local minimum value, and/or the optimal values of the parameters may be stored in a transitory and/or non-transitory computer-readable medium. However, the example embodiments are not limited thereto.

Figure 5:
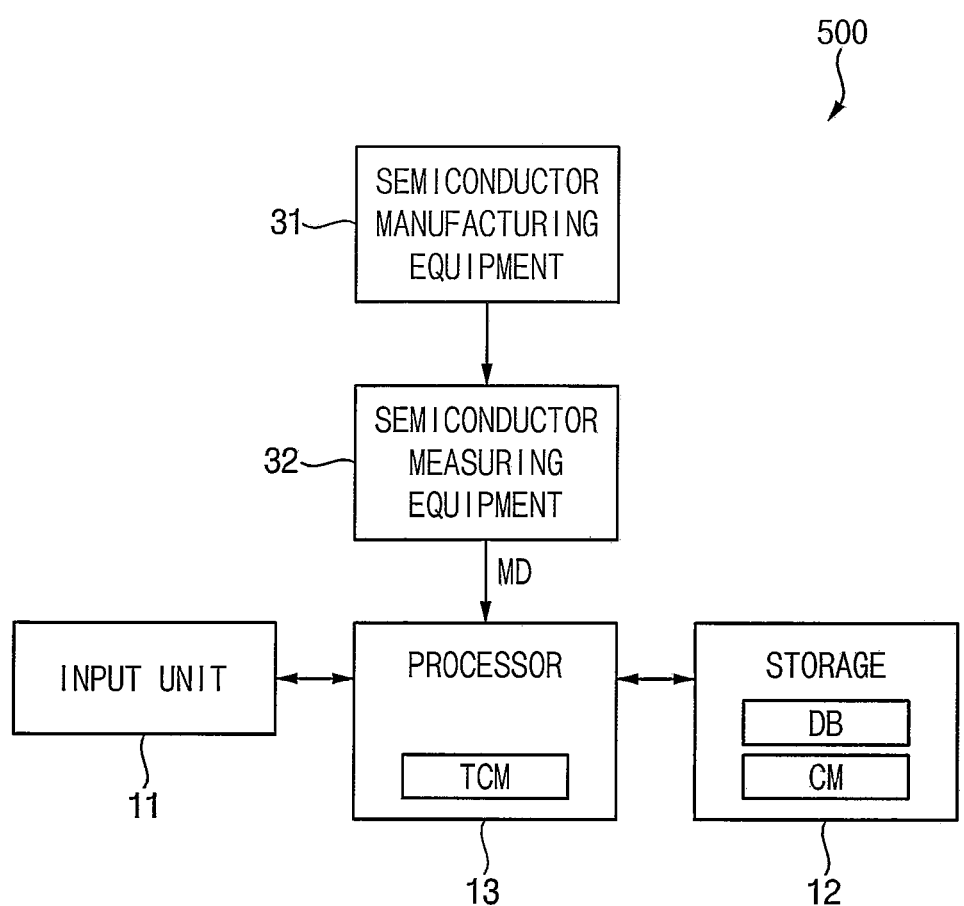
FIG. 5 is a block diagram illustrating electronic device according to some example embodiments.

FIG. 5 is a block diagram illustrating electronic device according to some example embodiments.

Referring to FIG. 5, an electronic device 500 may include an input unit 11, a storage 12, and a processor 13. In some example embodiments, the processor 13 may be the same or substantially similar to (and/or included in) the processors 110 of FIG. 4. The storage 12 may store a device model (or a compact model) CM and database DB. In some example embodiments, the device model CM and the database DB may be, respectively, the same or substantially similar to the device model 220 and the training control module 240 of FIG. 4. The electronic device 500, a semiconductor manufacturing equipment 31, and a semiconductor measuring equipment 32 may form a semiconductor system. In some example embodiments, a remainder of the electronic device 500 may be implemented as a semiconductor system separated from the semiconductor manufacturing equipment 31 and the semiconductor measuring equipment 32.

The input unit 11 may receive the device data and transmit the device data to processor 13, and the processor 13 may execute the training control module TCM to generate the compact model CM or optimize the parameters of the compact model CM.

The processor 13 may generate (and/or update) the compact model CM based on measurement data MD and store the compact model CM in the storage 12. The measurement data MD may include an electrical and/or structural characteristic of a semiconductor product actually measured by the semiconductor measuring equipment 32. The semiconductor product measured by the semiconductor measuring equipment 32 may have been manufactured by the semiconductor manufacturing equipment 31 based on semiconductor manufacturing data. The semiconductor manufacturing data may be related to a manufacture of a target semiconductor device and/or a manufacture of a semiconductor device the same and/or similar to the target semiconductor device.

For example, the compact model CM may be updated in response to the measurement of an electrical and/or structural characteristic of a semiconductor product by the semiconductor measuring equipment 32. For example, in response to the reception of the measurement data MD from the semiconductor measuring equipment 32, the processor 13 may update the compact model CM to reflect the latest measurement data MD. The processor 13 may receive the measurement data MD from the semiconductor measuring equipment 32 through the input unit 11 or a communication unit.

The storage 12 may include equipment information of at least one selected from the semiconductor manufacturing equipment 31 and/or the semiconductor measuring equipment 32. For example, a semiconductor product may have a different electrical and/or structural characteristic according to the type of the semiconductor manufacturing equipment 31. In addition, the electrical and/or structural characteristic of a semiconductor product may be differently measured according to the type of the semiconductor measuring equipment 32. To reduce the potential for errors involved in the types of the semiconductor manufacturing equipment 31 and the semiconductor measuring equipment 32, the storage 12 may include various kinds of equipment information such as information about a manufacturer of the semiconductor manufacturing equipment 31 and/or a manufacturer of the semiconductor measuring equipment 32, model information of the semiconductor manufacturing equipment 31 and the semiconductor measuring equipment 32, and/or performance information thereof. The processor 13 may update the compact model CM with reference to the equipment information stored in the storage 12.

The processor 13 may use the compact model CM, and/or the database DB to simulate and/or predict the performance of a semiconductor device manufactured by the semiconductor manufacturing equipment 31, e.g., before the semiconductor device is manufactured. The processor 13 may, for example, determine how a change to the design of the semiconductor device may change the characteristics of the semiconductor device. In some example embodiments, for example, the processor 13 may confirm a design based on these predictions thereby indicating that the design is okay to proceed to manufacturing and/or forwarding the design to a processor controlling the semiconductor manufacturing equipment 31. The semiconductor manufacturing equipment 31 may then manufacture a semiconductor device based on the confirmed design. The processor 13 may also pause (and/or stop) the production of semiconductor devices based on the design if, e.g., the change in the design would result in the characteristics of the semiconductor devices deteriorating below a threshold value. In some example embodiments a warning and/or a representation of how the characteristics are affected by the change in the design may be provided to a user (e.g., through the user interfaces 160 and/or the modem 150 of FIG. 2). In some example embodiments, the processor 13 may further provide data on what elements and/or changes are the source of the deterioration and/or suggestions for addressing the deterioration.

In some example embodiments, the processor 13 may also (e.g., periodically) confirm the prediction of the company model CM by comparing the prediction of a design with a semiconductor device manufactured based on the design, e.g., by using the measurement data MD received from the semiconductor measuring equipment 32 and/or using a data uncertainty value, as discussed below. For example, in some example embodiments, the processor 13 may store the prediction (e.g., in the storage 12), and then may compare the prediction to the semiconductor device manufactured based on the design. If the prediction and the manufactured semiconductor device differ, e.g., beyond a permissible threshold, the compact model CM stored in the storage 12 may be, e.g., updated based on the measurement data MD actually measured by the semiconductor measuring equipment 32, as discussed above.

Figure 6:
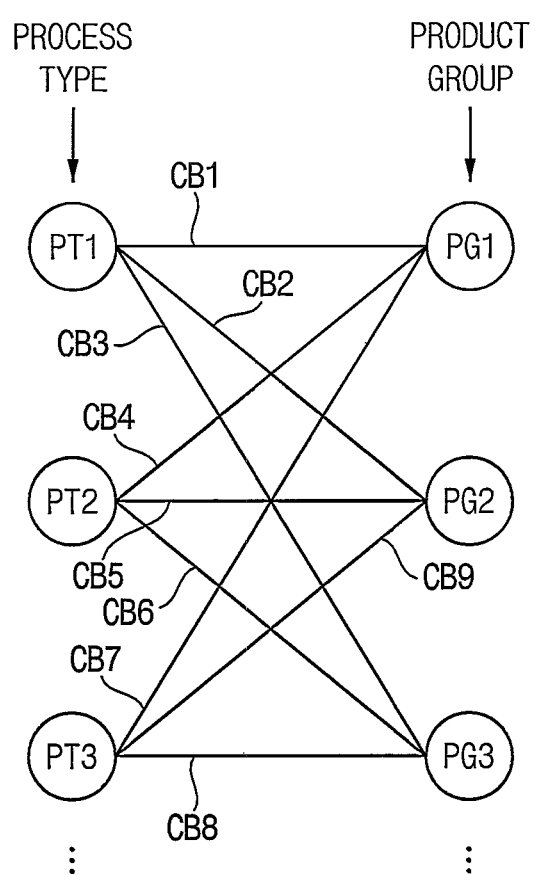
Figure 8:
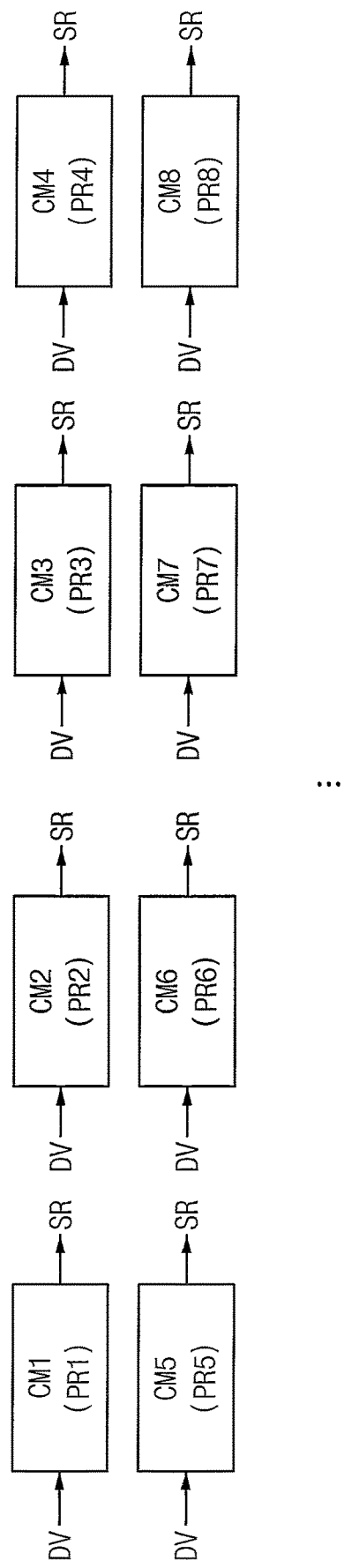

FIGS. 6, 7, and 8 are diagrams for describing a plurality of device models to which a method of generating a device model according to some example embodiments may be applied.

Referring to FIGS. 6, 7, and 8, the process data PR may be determined depending on a process-group combination PGC of a process type PT indicating a manufacturing process of each semiconductor product SP and a product group PG in which each semiconductor product SP is included. For example, the process type PT may indicate a critical dimension (CD) of the manufacturing process. The product group PG may include a server product group, a mobile product group, a graphic product group, a high bandwidth memory product group, and/or the like.

A first semiconductor product SP1 may correspond to a first process-product combination CB1 of a first process type PT1 and a first product group PG1, and the process data PR of the first semiconductor product SP1 may be determined as first process data PR1. A second semiconductor product SP2 may correspond to a second process-product combination CB2 of the first process type PT1 and a second product group PG2, and the process data PR of the second semiconductor product SP2 may be determined as second process data PR2. A third semiconductor product SP3 may correspond to a third process-product combination CB3 of the first process type PT1 and a third product group PG3, and the process data PR of the third semiconductor product SP3 may be determined as third process data PR3.

A fourth semiconductor product SP4 may correspond to a fourth process-product combination CB4 of a second process type PT2 and the first product group PG1, and the process data PR of the fourth semiconductor product SP4 may be determined as fourth process data PR4. A fifth semiconductor product SP5 may correspond to a fifth process-product combination CB5 of the second process type PT2 and the second product group PG2, and the process data PR of the fifth semiconductor product SP5 may be determined as fifth process data PR5. A sixth semiconductor product SP6 may correspond to a sixth process-product combination CB6 of the second process type PT2 and the third product group PG3, and the process data PR of the sixth semiconductor product SP6 may be determined as sixth process data PR6.

A seventh semiconductor product SP7 may correspond to a seventh process-product combination CB7 of a third process type PT3 and the first product group PG1, and the process data PR of the seventh semiconductor product SP7 may be determined as seventh process data PR7. An eighth semiconductor product SP8 may correspond to an eighth process-product combination CB8 of the third process type PT3 and the third product group PG3, and the process data PR of the eighth semiconductor product SP8 may be determined as eighth process data PR8. A ninth semiconductor product SP9 may correspond to a ninth process-product combination CB9 of a third process type PT3 and the second product group PG2, and the process data PR of the ninth semiconductor product SP9 may be determined as ninth process data (not shown).

The measurement data MD may be provided with respect to each of the first through eighth semiconductor products SP1~SP8 as described with reference to FIG. 5, and first through eighth compact models CM1~CM8 respectively corresponding to the first through eighth semiconductor products SP1~SP8 may be generated as illustrated in FIG. 8.

The compact models are configured to provide the characteristics of semiconductor device within the range of the device data utilized in (and/or required) for designing. FIG. 8 illustrates the first through eighth compact models CM1~CM8 respectively corresponding to the first through eighth process data PR1~PR8.

For example, the test element groups may be disposed scribe lanes of a wafer to provide the measurement data for generating the compact models. However, there may exist time increases and/or difficulties in securing coverage of data range to generate the compact modes, due to limited area of the scribe lanes, process turn-around-time (TAT), and so on.

According to some example embodiments, the characteristics of the semiconductor device included in the target semiconductor product (e.g., the ninth semiconductor product SP9) may be provided efficiently and rapidly using the previously developed compact models (e.g., the first through eight compact models CM1~CM8) of the previously developed semiconductor products (e.g., the first through eighth semiconductor products SP1~SP8). For example, by performing a method of generating a device model, the parameters of the previously developed compact models may be optimized based on the measurement data of the target semiconductor product and thus the compact model corresponding to the target semiconductor product may be generated efficiently.

The plurality of previous semiconductor products and the target semiconductor product may be (and/or be included in) memory devices. Some example embodiments are particularly useful in predicting the characteristics of the memory devices. In the memory business, the design technology co-optimization (DTCO) becomes more significant, e.g., providing device models rapidly for designing memory devices of next generations. In addition, the identical and/or similar semiconductor devices of the previous generation are used as the shrunken form in the next generation with respect to the memory devices, and thus the database for a new memory device may be efficiently established using the established compact models of the previous memory devices.

Figures 9, 10:
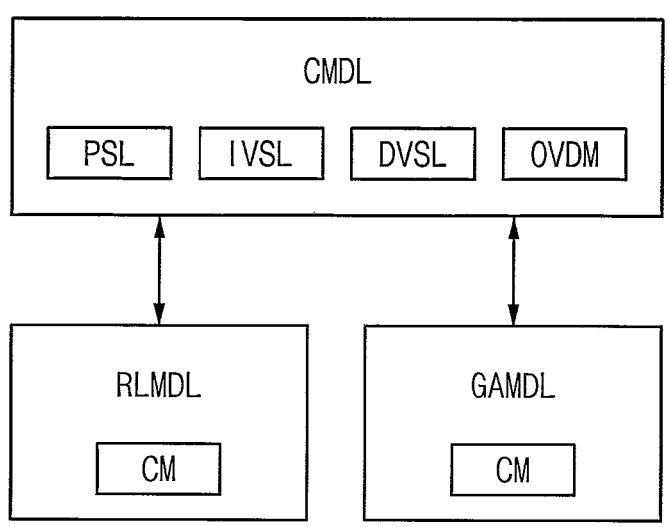
FIG. 9 is a diagram illustrating data in a method of generating a device model according to some example embodiments.
FIG. 10 is a diagram illustrating a training control module performing a method of generating a device model according to some example embodiments.

FIG. 9 is a diagram illustrating data in a method of generating a device model according to some example embodiments. FIG. 9 illustrates example data when a semiconductor device corresponds to a transistor. However, the example embodiments are not limited to transistors and may be applied to semiconductor (or electronic) devices of other types.

Referring to FIG. 9, input data of a compact model may include device data DV and/or process data PR.

The device data DV may indicate structure and operation condition of the semiconductor device. For example, the device data DV may include information on the structure of the semiconductor device such as a width W of a transistor, a length L of the transistor, and so on. In addition, the device data DV may include information of the operation condition of the semiconductor device such as an operation temperature Top of the transistor, a drain voltage $V_d$, a gate voltage $V_g$, a body voltage $V_b$, a source voltage $V_s$ of the transistor, and/or the like.

The process data PR may indicate condition of manufacturing process of the semiconductor device. For example, the process data PR may include a kind Dk of a dopant in an ion-implanting process, a density Dd of the dopant, an activation temperature Tact, a thickness tOG of a gate oxide layer, a thickness of a spacer tSP in a gate structure of the transistor, and/or the like.

Output data of the compact model may include simulation result data SR. The above-described method of generating a device model may be performed based on comparison of the simulation result data SR and the measurement data.

The simulation result data SR may indicate electrical characteristics of the semiconductor device. For example, the simulation result data SR may include a threshold voltage Vt, a gain G, a breakdown voltage Vbk, a drain current Id of the transistor, and/or the like.

FIG. 10 is a diagram illustrating an example embodiment of a training control module performing a method of generating a device model according to example embodiments.

Referring to FIG. 10, a training control module TCM may include a control module CMDL and a reinforcement learning module RMDL. In some example embodiments, the training control module TCM may further include a genetic algorithm module GAMDL.

The control module CMDL may include a parameter selection unit PSL, an initial value selection unit IVSL, a device value selection unit DVSL and an optimal value determination unit OVDM. The parameter selection unit PSL may select and provide target parameters among parameters of a device model. The initial value selection unit IVSL may select and provide initial value sets corresponding to different combinations of initial values of the target parameters. The device value selection unit DVSL may select and provide a device value set corresponding to a combination of values of device data. The optimal value determination unit OVDM may determine optimal values of the target parameters based on local minimum values provided from the reinforcement learning module RLMDL or global minimum values provided from the genetic algorithm module GAMDL.

The reinforcement learning module RLMDL and the genetic algorithm module GAMDL may search for the optimal values of the target parameters based on comparison of the simulation result data and the measurement data. The reinforcement learning module RMDL may determine the above-described local minimum values respectively corresponding to the initial value sets. Example embodiments of the reinforcement learning module RMDL will be described below with reference to FIGS. 17, 18 and 19.

The genetic algorithm module GAMDL may search for the global minimum values based on the optimal values of the target parameters corresponding to the local minimum values.

The genetic algorithm indicates an optimizing scheme using concepts of natural selection and gene that are basic principles of evolution. According to the genetic algorithm, the solution group for a given question may be generated by random such as selection, crossover and mutation, and the solution group is developed to obtain good solution. The genetic algorithm is one of evolution algorithms based on solution group and are applied to various field such as design of integrated circuits, training of artificial intelligence (AI) neural network, and so on. The genetic algorithm module GAMDL may be implemented variously by method known to skilled in the art.

Figure 11:
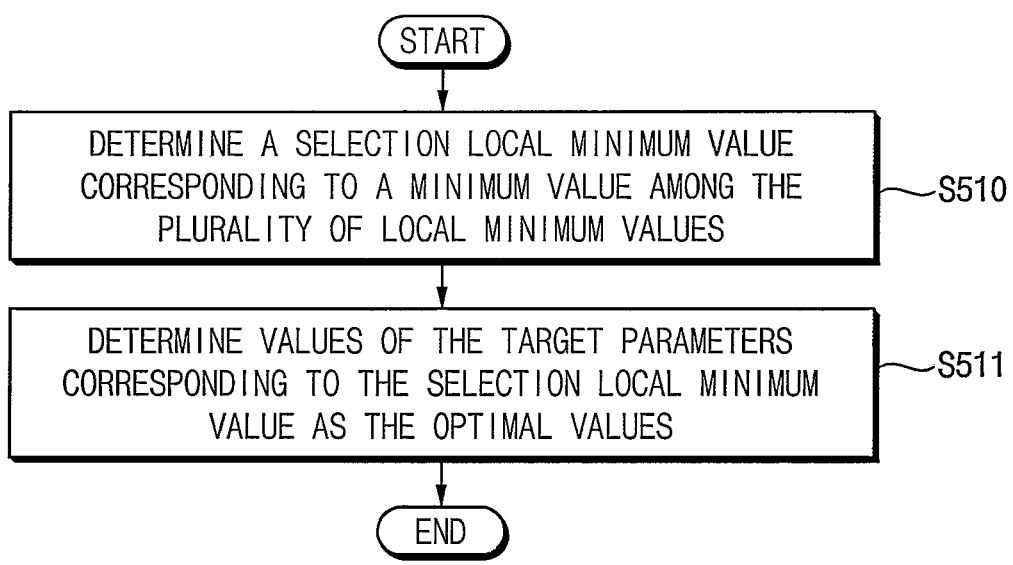
FIG. 11 is a flowchart illustrating an example of determining optimal values in a method of generating a device model according to some example embodiments.
Figure 12:
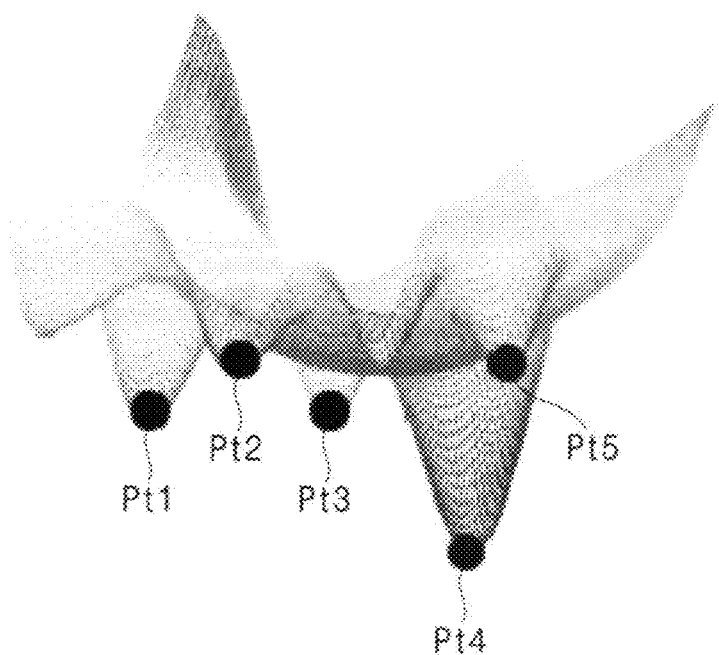

FIG. 11 is a flowchart illustrating an example of determining optimal values in a method of generating a device model according to some example embodiments, and FIGS. 12 and 13 are diagrams for describing the example \of determining optimal values of FIG. 11.

Referring to FIG. 11, a selection local minimum value corresponding to a minimum value may be selected among the plurality of local minimum values (S510) and values of the target parameters corresponding to the selection local minimum value may be determined as the optimal values (S511).

FIGS. 12 and 13 illustrate an example of results of reinforcement learning RL when the number of the plurality of initial value sets ISV is five. A first through fifth points Pt1~Pt5 respectively correspond to first through fifth initial value sets IV1~IV5, and each initial value set may include initial values corresponding to the number of the target parameters. The first through fifth points Pt1~Pt5 may be represented by combinations (PV1, LM1)~(PV5, LM5) of the first through fifth local minimum values LM1~LM5 and first through fifth values PV1~PV5 of the target parameters.

As illustrated in FIGS. 12 and 13, the first through fifth points Pt1~Pt5 may be different from each other. With respect to each initial value set IVi (i=1~5) of the first through fifth initial value sets IV1~IV5, each local minimum value LMi corresponding to each initial value set IVi may be determined by changing values of target parameters starting from each initial value set IVi based on the reinforcement learning RL. When the initial value set is changed, the result of the reinforcement learning may be changed. A plurality of local minimum values may be obtained by repeatedly performing the reinforcement learning RL based on a plurality of initial value sets, and the minimum value of the plurality of local minimum values may be determined as the selection local minimum value. In the example of FIGS. 12 and 13, the fourth local minimum value LM4 may be determined as the selection local minimum value and the fourth values PV4 may be determined as the optimal values of the target parameters.

Figure 14:
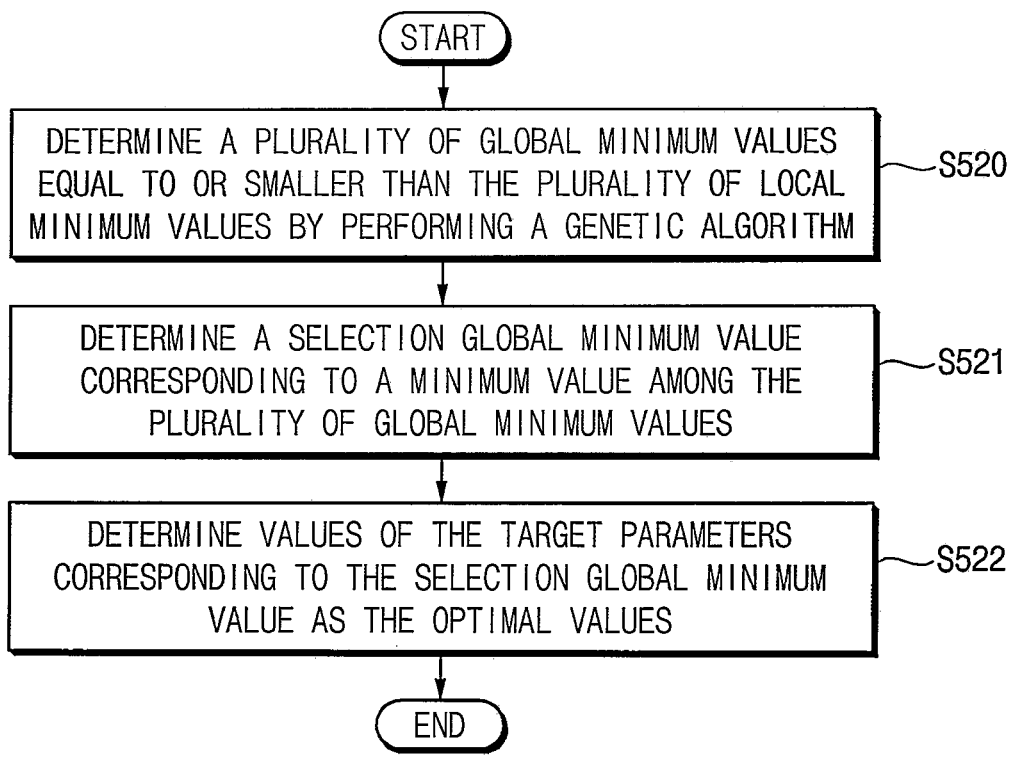
FIG. 14 is a flowchart illustrating an example of determining optimal values in a method of generating a device model according to some example embodiments.
Figure 15:
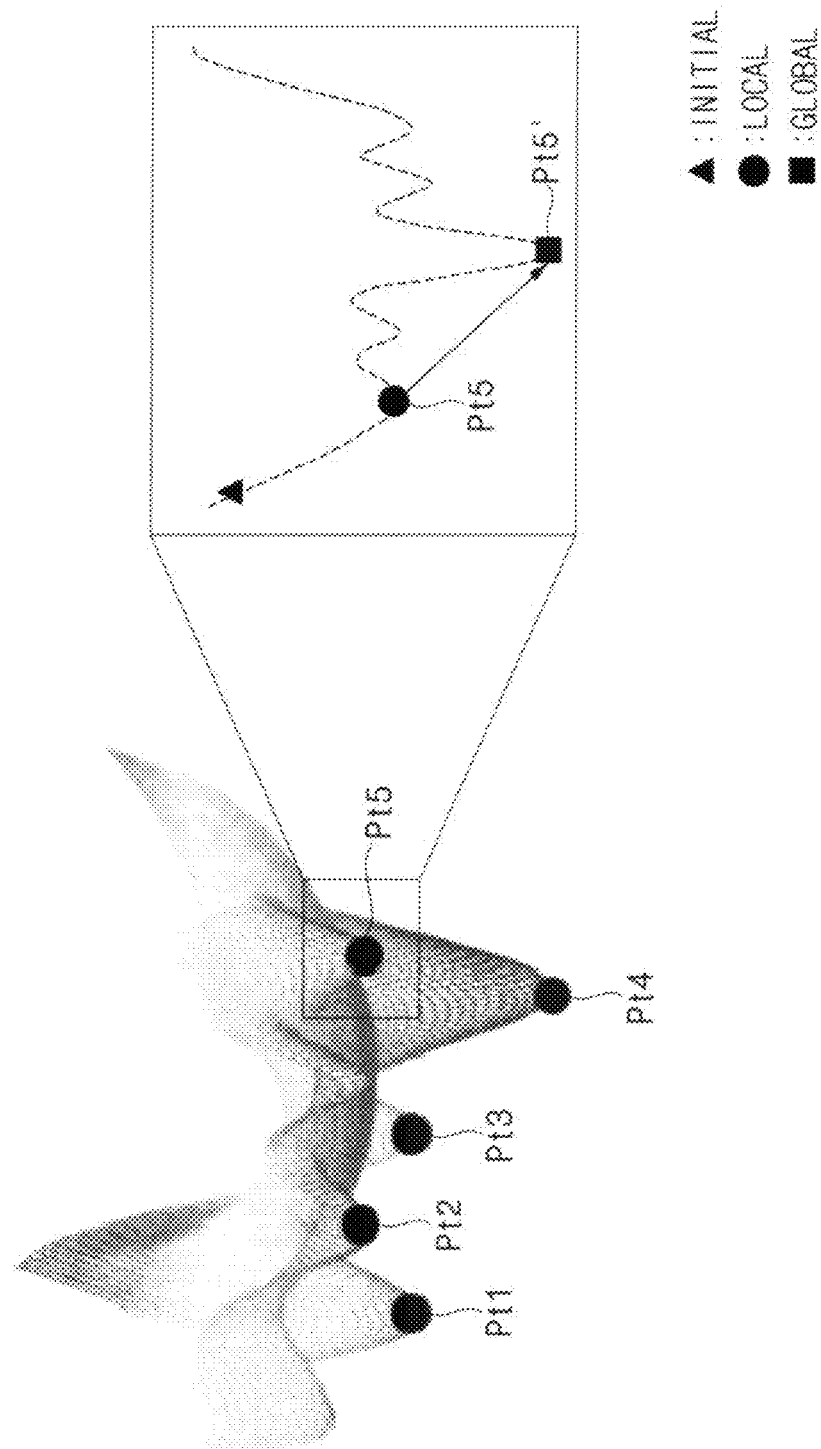

FIG. 14 is a flowchart illustrating an example of determining optimal values in a method of generating a device model according to example embodiments, and FIGS. 15 and 16 are diagrams for describing the example of determining optimal values of FIG. 14.

Referring to FIG. 14, a plurality of global minimum values equal to or smaller than the plurality of local minimum values may be determined by performing a genetic algorithm (S520). A selection global minimum value corresponding to a minimum value may be determined among the plurality of global minimum values (S521) and values of the target parameters corresponding to the selection global minimum value may be determined as the optimal values (S522).

For example, the first through fifth points Pt1~Pt5 in FIGS. 12 and 13 may be further optimized in first through first calibrated points Pt1'~Pt5' in FIGS. 15 and 16 by performing the genetic algorithm with respect to each of the first through fifth points Pt1~Pt5. FIG. 15 illustrates, as an example, that the fifth point Pt1 is further optimized into the fifth calibrated point Pt5', where a point corresponding to the fifth initial value set IV5 is represented by a triangle, the fifth point Pt5 corresponding to the local minimum value according to the reinforcement learning RL is represented by a circle and the fifth calibrated point Pt5' corresponding to the global minimum value according to the reinforcement learning RL and the genetic algorithm GA is represent by a rectangle. As such, the first through fifth calibrated points Pt1'~Pt5' may be represented by combinations (PV1', GM1) ~(PVS', GM5) of the first through fifth global minimum values GM1~GM5 and first through fifth values PV1'~PV5' of the target parameters.

In general, the search based on the genetic algorithm takes a relatively long time. According to example embodiments, the reinforcement learning may be firstly performed to obtain the values of the target parameters corresponding to the local minimum value, and then the genetic algorithm may be performed to further optimize the values of the target parameters. As a result, the device model having enhanced performance may be generated efficiently.

Figure 17:
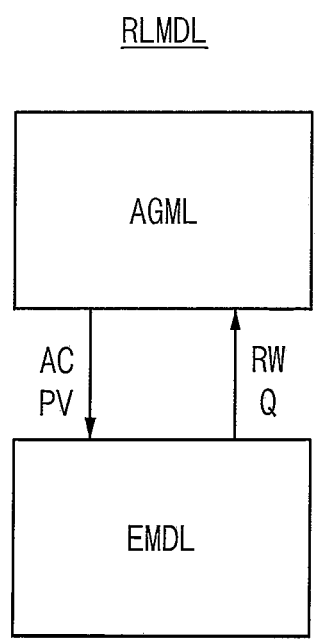
FIG. 17 is a block diagram illustrating an example of a reinforcement learning module included in the training control module of FIG. 10.
Figure 18:
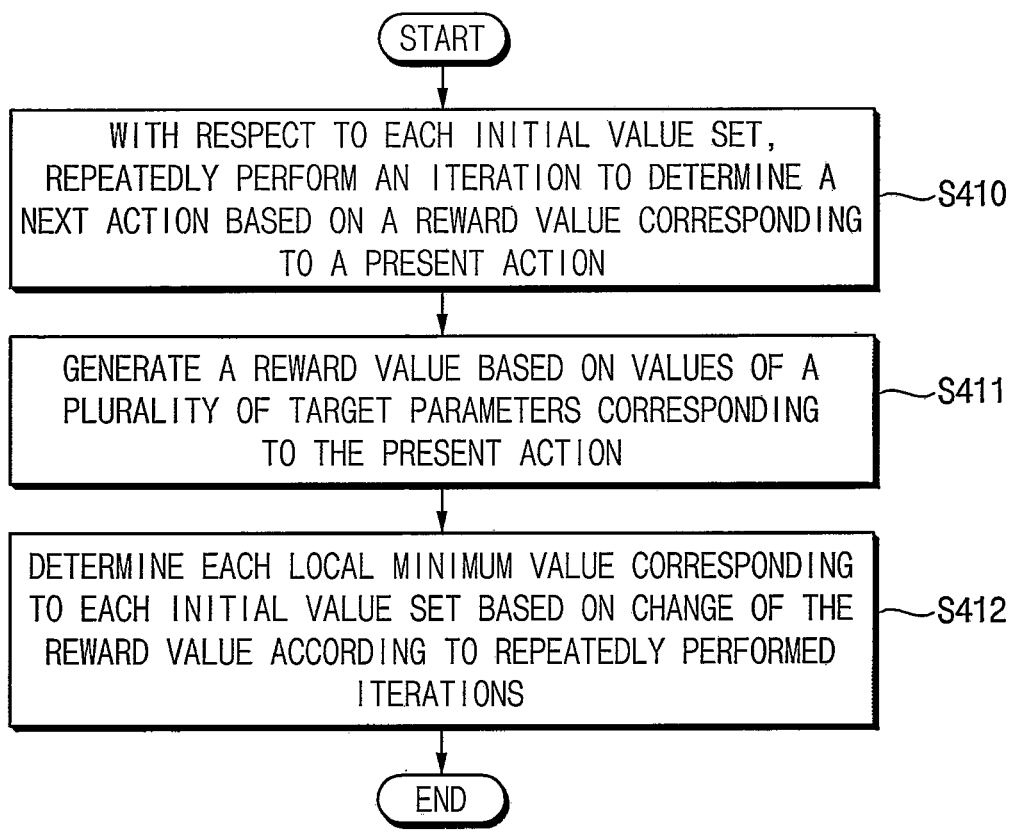
FIG. 18 is a flow chart illustrating an example of determining a local minimum value by the reinforcement learning module of FIG. 17.

FIG. 17 is a block diagram illustrating an example of a reinforcement learning module included in the training control module of FIG. 10, and FIG. 18 is a flow chart illustrating an example of determining a local minimum value by the reinforcement learning module of FIG. 17.

Referring to FIG. 17, a reinforcement learning module RLMDL may include an agent module AGML and an environment module EMDL.

The agent module AGML may, with respect to each initial value set of the plurality of initial value sets, repeatedly perform an iteration to determine a next action based on a reward value corresponding to a present action. The environment module EMDL may generate the reward value based on the values of the target parameters corresponding to the present action. The agent module AGML may determining each local minimum value corresponding to each initial value set based on change of the reward value according to repeatedly performed iterations.

In some example embodiments, the reinforcement learning module RLMDL may perform deep reinforcement learning as illustrated in FIG. 18.

Referring to FIGS. 17 and 18, the agent module AGML may, with respect to each initial value set of the plurality of initial value sets, repeatedly performing an iteration to determine a next action among a plurality of candidate actions based on a reward value and a plurality of Q values corresponding to a present action among the plurality of candidate actions, where the plurality of candidate actions indicate change of values of the target parameters (S410).

The environment module EMDL may generate the reward value and the plurality of Q values based on values of the target parameters corresponding to the present action, where the plurality of Q values indicate prediction reward values of the plurality of candidate actions (S411).

The agent module AGML may determine each local minimum value corresponding to each initial value set based on change of the reward value according to repeatedly performed iterations (S412).

Figure 19:
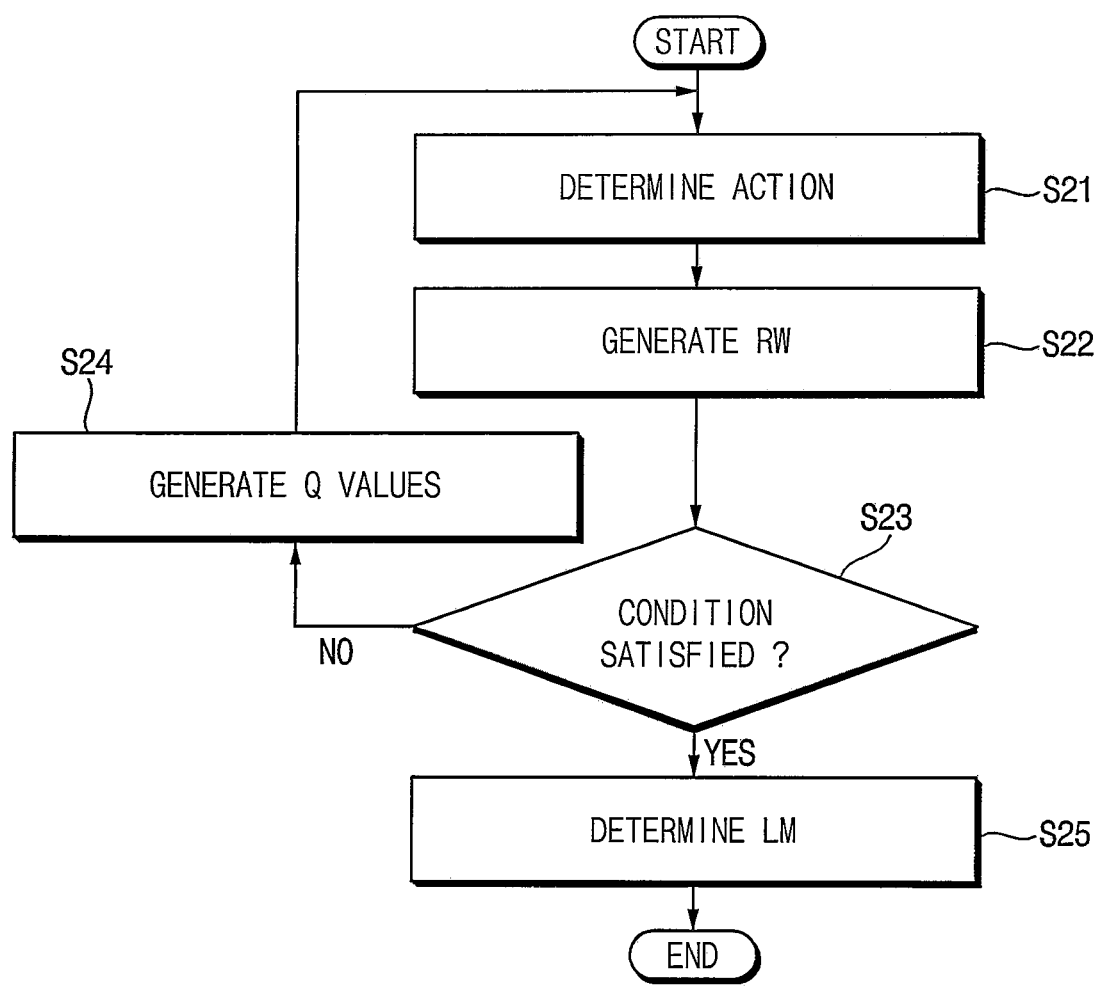
FIG. 19 is a flow chart illustrating an overall operation of the reinforcement learning module of FIG. 17.

FIG. 19 is a flow chart illustrating an overall operation of the reinforcement learning module of FIG. 17. The operations as illustrated in FIG. 19 may be performed, e.g., with respect to each initial value set.

The agent module AGML may determine the present action based on the reward value and the plurality of Q values corresponding to the previous action (S21). The environment module EMDL may generate the reward value RW based on the difference DIFF between the measurement data and the simulation result data corresponding to the present action. The difference DIFF may be determined based on the values of the target parameters that are changed by the present action.

The agent module AGML may determine whether a condition for determining the local minimum value LM is satisfied (S23). For example, the agent module AGML may determine whether the condition is satisfied based on Expression 1.

$$RW_t - RW_t - 1 < \varepsilon \qquad \text{Expression 1}$$

In Expression 1, $RW_t$ indicates the reward value corresponding to the present action of the t-th iteration, $RW_t-1$ indicates the reward value corresponding to the previous action of the (t−1)-th iteration, and $\varepsilon$ indicates a reference value. The agent module AGML may determine that the condition for the local minimum value LM is satisfied when the condition of Expression 1 is satisfied for a predetermined number of iterations.

When the condition for the local minimum value LM is satisfied (S23: YES), the agent module AGML may determine the difference DIFF corresponding to the present values of the target parameters as the local minimum value LM (S25) and stop operation.

When the condition for the local minimum value LM is not satisfied (S23: NO), the environment module EMDL may generate the plurality of Q values corresponding to the values of the target parameters that are changed by the present action (S24).

As such, the iteration may be repeated to determine the next action based on the reward value RW and the plurality of Q values provided from the environment module EMDL until the condition for the local minimum value LM is satisfied.

The reinforcement learning may be implemented as algorithm software, a corresponding hardware, or a combination of software and hardware, comprised of an environment, an agent, a state, an action and a reward. First the agent may take an action to move into a new state. The agent may receive two rewards for the action, that is, an immediate reward and a future reward, from the environment. The immediate reward indicates an instant reward for the taken action and the future reward indicates a reward for a future environment by the action. The above-described reward value RW may correspond to the immediate reward and the above-described Q values may correspond to the future reward.

As shown in Expression 2, the ultimate object of the agent is to update the Q values such that the two rewards may be maximized.

$$Q_{t+1}(s_t, a_t) = Q_t(s_t, a_t) + \alpha_t(s_t, a_t) * [r_{t+2} \gamma \max_a Q_t(s_{t+1}, a) - Q(s_t, a_t)] \qquad \text{Expression 2}$$

In Expression 2, 's' indicates the state, 'a' indicates the action, 'r' indicates the reward. '$\gamma\gamma$' is a discount factor having a value between 0 and 1, and the future reward may be emphasized as the discount factor approached the value of 1. In some example embodiments, the discount factor may be set to the value of 0.5 to consider evenly the present and future rewards. '$a_t\alpha_t$' is a learning rate having a value between 0 and 1 to determine a leaning speed of the Q value. For example, the agent may not perform the learning when $a_t=0\alpha_t=0$, and the agent may perform the learning using the most recent information when $\alpha_t=1a_t=1$.

The reinforcement learning module RLMDL as described above may include at least one artificial neural network as will be described below with reference to FIGS. 20A, 20B and 20C.

Figure 20A:
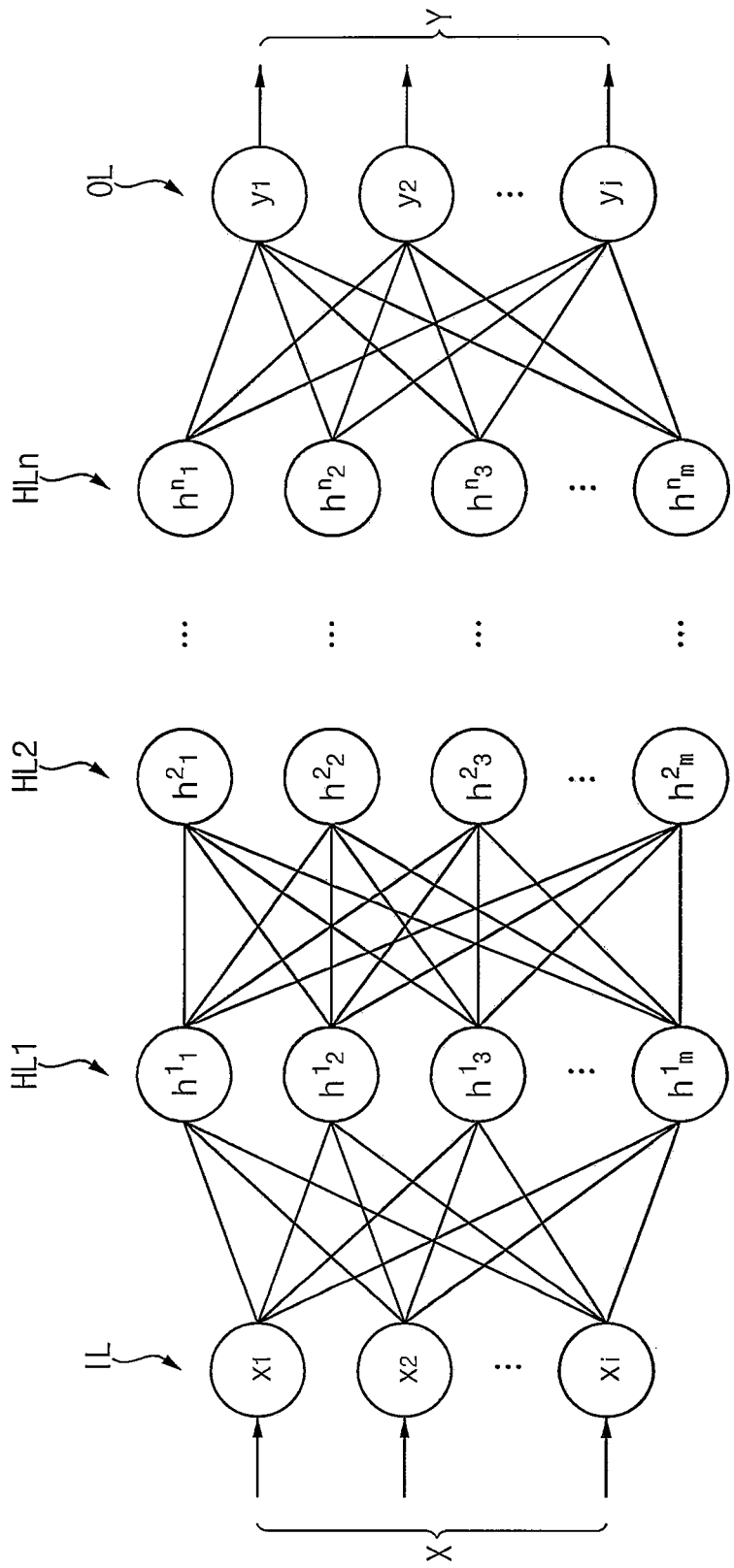
FIGS. 20A and 20B are diagrams for describing examples of an artificial neural network structure.
Figure 20B:
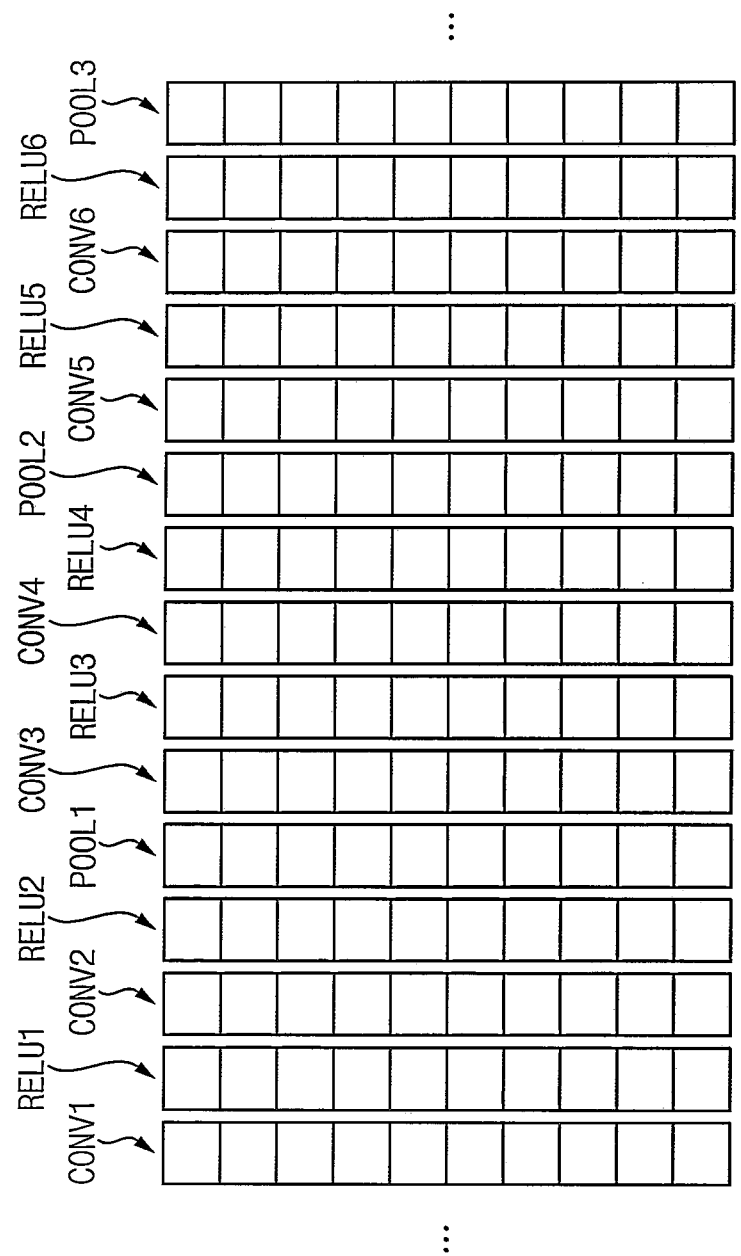

FIGS. 20A and 20B are diagrams for describing examples of an artificial neural network structure.

Referring to FIG. 20A, a general neural network may include an input layer IL, a plurality of hidden layers HL1, HL2, . . . , HLn and an output layer OL.

The input layer IL may include i input nodes x1, x2, . . . , xi, where i is a natural number. Input data (e.g., vector input data) X whose length is i may be input to the input nodes x1, x2, . . . , xi such that each element of the input data X is input to a respective one of the input nodes x1, x2, . . . , xi.

The plurality of hidden layers HL1, HL2, HLn may include n hidden layers, where n is a natural number, and may include a plurality of hidden nodes $h^1_1$, $h^1_2$, $h^1_3$, ..., $h^1_m$, $h^2_1$, $h^2_2$, $h^2_3$, ..., $h^2_m$, $h^n_1$, $h^n_2$, $h^n_3$, ..., $h^n_m$. For example, the hidden layer HL1 may include m hidden nodes $h^1_1$, $h^1_2$, $h^1_3$, ..., $h^1_m$, the hidden layer HL2 may include m hidden nodes $h^2_1$, $h^2_2$, $h^2_3$, ..., $h^2_m$, and the hidden layer HLn may include m hidden nodes $h^n_1$, $h^n_2$, $h^n_3$, ..., $h^n_m$, where m is a natural number.

The output layer OL may include j output nodes y1, y2, ..., yj, providing output data Y where j is a natural number. The output layer OL may output the output data Y associated with the input data X.

A structure of the neural network illustrated in FIG. 20A may be represented by information on branches (or connections) between nodes illustrated as lines, and a weighted value assigned to each branch. Nodes within one layer may not be connected to one another, but nodes of different layers may be fully (and/or partially) connected to one another.

Each node (e.g., the node $h^1_1$) may receive an output of a previous node (e.g., the node $x_1$), may perform a computing operation, computation and/or calculation on the received output, and may output a result of the computing operation, computation, or calculation as an output to a next node (e.g., the node $h^2_1$). Each node may calculate a value to be output by applying the input to a specific function, e.g., a nonlinear function.

Generally, the structure of the neural network may be set in advance, and the weighted values for the connections between the nodes are set appropriately using data having an already known answer of which class the data belongs to. The data with the already known answer may be referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 20A may not be suitable for and/or inefficient for some operations, such as handling input image data (or input sound data), because each node (e.g., the node $h^1_1$) is connected to all nodes of a previous layer (e.g., the nodes x1, x2, ..., xi included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the convolutional neural network.

Referring to FIG. 20B, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOL3 and FC.

Unlike the general neural network, each layer of the convolutional neural network may have three dimensions of width, height, and depth, and thus data that is input to each layer may be volume data having three dimensions of width, height, and depth.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window, and/or kernel.

For example, parameters of each convolutional layer may comprise (and/or include) a set of learnable filters. Every filter may be spatially small (e.g., along width and/or height), but may extend through the full depth of an input volume. For example, during the forward pass, each filter may be slid (e.g., convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having four filters with zero-padding, output volume data of the convolutional layer CONV1 may have a size of 32×32×12 (e.g., a depth of volume data increases).

Each of the rectifying linear unit (RELU) layers RELU1, RELU2, RELU3, RELU4, RELU5 and RELU6 may perform a rectified linear unit operation that corresponds to an activation function defined by, e.g., a function f(x)=max(0, x) (e.g., an output is zero for all negative input x). For example, if input volume data having a size of 32×32×12 passes through the RELU layer RELU1 to perform the rectified linear unit operation, output volume data of the RELU layer RELU1 may have a size of 32×32×12 (e.g., a size of volume data is maintained).

Each of pooling layers POOL1, POOL2 and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing characteristics of the input data X. However, in some example embodiments, the type and number of layers including in the convolution neural network may be changed variously.

Example embodiments of the deep learning model are not limited to a specific neural network. The deep learning model may include, for example, at least one of GAN (Generative Adversarial Network), CNN (Convolution Neural Network), R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network and BNN (Bayesian Neural Network). Additionally (and/or alternatively), the deep learning model(s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, and/or combinations thereof including ensembles such as random forests.

Figure 20C:
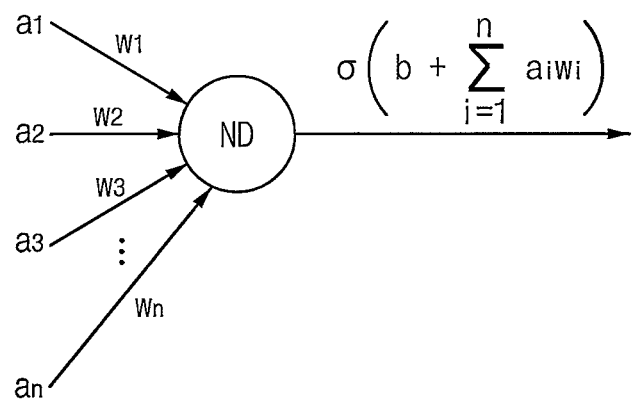
FIG. 20C is a diagram illustrating an example of a node included in an artificial neural network.

FIG. 20C is a diagram illustrating an example of a node included in an artificial neural network.

FIG. 20C illustrates an example node operation performed by a node ND in a neural network. When N inputs a1~an are provided to the node ND, the node ND may multiply the n inputs a1~an and corresponding n weights w1~wn, respectively, may sum n values obtained by the multiplication, may add an offset "b" to a summed value, and may generate one output value by applying a value to which the offset "b" is added to a specific function "6". The learning operation may be performed based on the training data to update all nodes in the neural network.

FIG. 21 is a diagram illustrating an example of candidate actions by the reinforcement learning module of FIG. 17.

FIG. 21 illustrates an example of three target parameters, e.g., first, second and third target parameters p1, p2, and p3. For example, the plurality of candidate actions may include first through eighth candidate actions CAC1~CAC8. In FIG. 21, $\Delta p1$ indicates change of the first target parameter p1, $\Delta p2$ indicates change of the second target parameter p2, and $\Delta p3$ indicates change of the third target parameter p3. In FIG. 21, the value of '0' may indicate decreasing the corresponding target parameter by a unit value, and the value of '1' may indicate increasing the corresponding target parameter by the unit value. The unit value may be equal to or different with respect to $\Delta p1$, $\Delta p2$ and $\Delta p3$.

For example, the fifth candidate action CAC5 indicates that the first target parameter p1 is decreased by the unit value, the second target parameter p2 is increased by the unit value and the third target parameter p3 is increased by the unit value, from the present values of the target parameters p1, p2 and p3.

Figure 22:
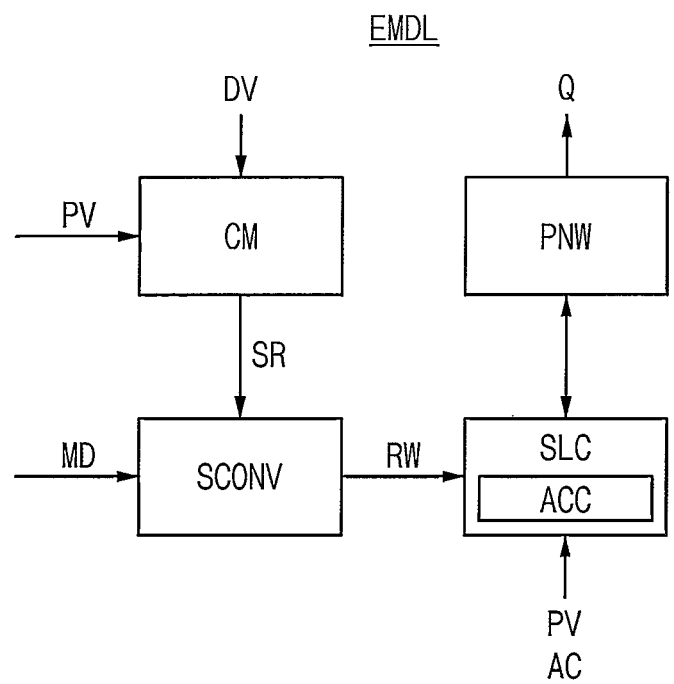
FIG. 22 is a diagram illustrating an example of an environment module included in the reinforcement learning module of FIG. 17.

FIG. 22 is a diagram illustrating an example of an environment module included in the reinforcement learning module of FIG. 17.

Referring to FIG. 22, an environment module EMDL may include a device model (or a compact model) CM, a converter SCONV, a controller SLC and a prediction network PNW.

The device model CM may generate the simulation result data SR based on the device data DV and the values PV of the target parameters corresponding to the present action.

The converter SCONV may generate the reward value RW based on the difference between the measurement data MD and the simulation result data SR. The converter SCONV may increase the reward value RW as the difference between the measurement data MD and the simulation result data SR is decreased. For example, the reward value RW may be inversely proportional to the difference.

The controller SLC may control training of the prediction network PNW based on the reward value RW and the values PV of the target parameters corresponding to the present action AC.

In some example embodiments, the simulation learning controller SLC may store accumulation information ACC by accumulating actions AC, the values of the target parameters PV and the reward values RW provided during a plurality of iterations and train the prediction network PNW based on the accumulation information ACC. The bias during the training of the prediction network PNW may be prevented or reduced by training the prediction network PNW based on the accumulation information ACC.

Figure 23:
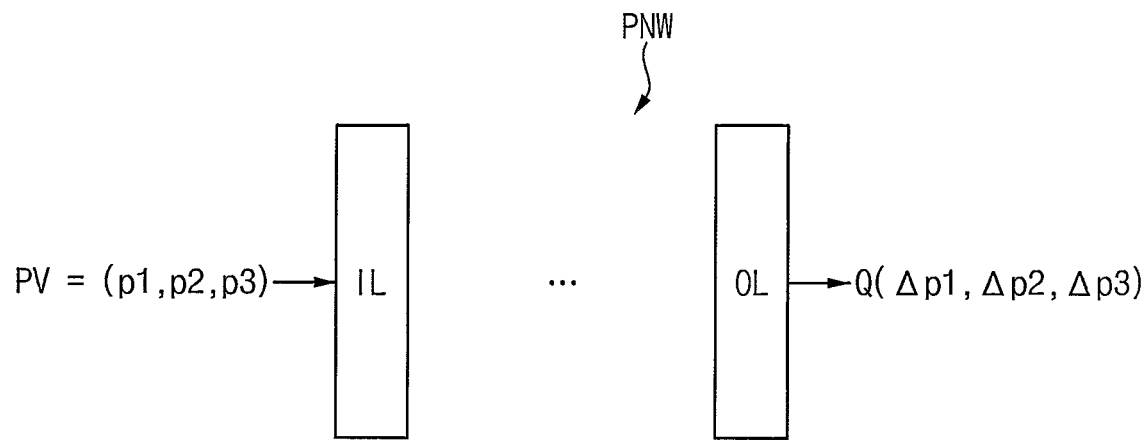
FIG. 23 is a diagram illustrating a prediction network that is trained by the environment module of FIG. 22.

FIG. 23 is a diagram illustrating a prediction network that is trained by the environment module of FIG. 22.

Referring to FIG. 23, the prediction network PNW and the compensation network CNW may include an input layer IL receiving the values PV of the target parameters corresponding to the state of the deep reinforcement learning and an output layer OL generating the Q values Q($\Delta p1$, $\Delta p2$, $\Delta p3$). For convenience of illustration, the hidden layers between the input layer IL and the output layer OL are omitted in FIG. 23. The structure of the prediction network PNW and the compensation network CNW may be designed variously as described with reference to FIGS. 20A, 20B, and/or 20C.

Figure 24:
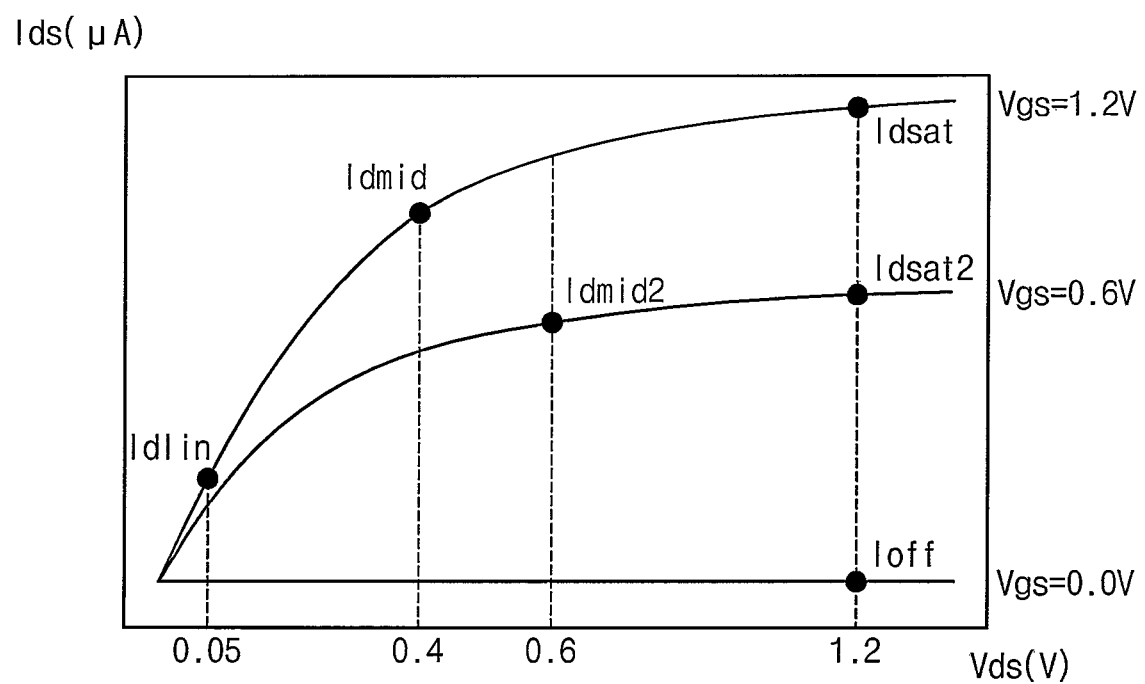
FIG. 24 is a diagram illustrating example reference points on current-voltage curves of a semiconductor device according to some example embodiments.

FIG. 24 is a diagram illustrating example reference points on current-voltage curves of a semiconductor device, and FIG. 25 is a diagram illustrating an example device data corresponding to the reference points of FIG. 24.

Hereinafter, some example embodiments are described based on a case that the semiconductor device is a transistor and a current-voltage curve indicates a change of a drain-source current Ids of the transistor according to a change of a drain-source voltage Ids of the transistor with respect to at least one gate-source voltage Vgs, but example embodiments are not limited thereto and may be applied to other semiconductor devices (e.g., two-terminal devices like diodes, three-terminal devices like rectifiers, four-terminal devices like optocouplers, electronic components of other types mimicking and/or coupled to semiconductor devices (e.g., microelectromechanical systems (MEMS), resistors, capacitors, integrated cells, etc.), and/or the like). For example, the semiconductor device may be replaced with a MOS capacitor and/or the current-voltage curve may be replaced with a capacitance-voltage curve.

In some example embodiments, as illustrated in FIG. 24, the current-voltage curve may include a plurality of gate voltage curves respectively corresponding to a plurality of gate-source voltages Vgs=0.0V, Vgs=0.6V and Vgs=1.2V. The plurality of reference points may be extracted such that the plurality of reference points may be distributed on the plurality of gate voltage curves. The number and the positions on the curves of the reference points may be determined based, e.g., on the characteristics of the semiconductor device.

As illustrated in FIGS. 24 and 25, each of the six reference points may be represented by different combinations of the device data DV and the electrical target ET. For example, the six device value sets may correspond to different combinations of the drain-source voltage Vds and the gate-source voltage Vgs, and the electrical target ET may include six drain source currents Idsat, Idsat2, Idmid, Idmid2, Idlin and Idoff respectively corresponding to the six device value sets. As such, the device value selection unit DVSL in FIG. 10 may select a plurality of device value sets to be provided to the reinforcement learning module RLMDL and the genetic algorithm module GAMDL.

Figure 28:
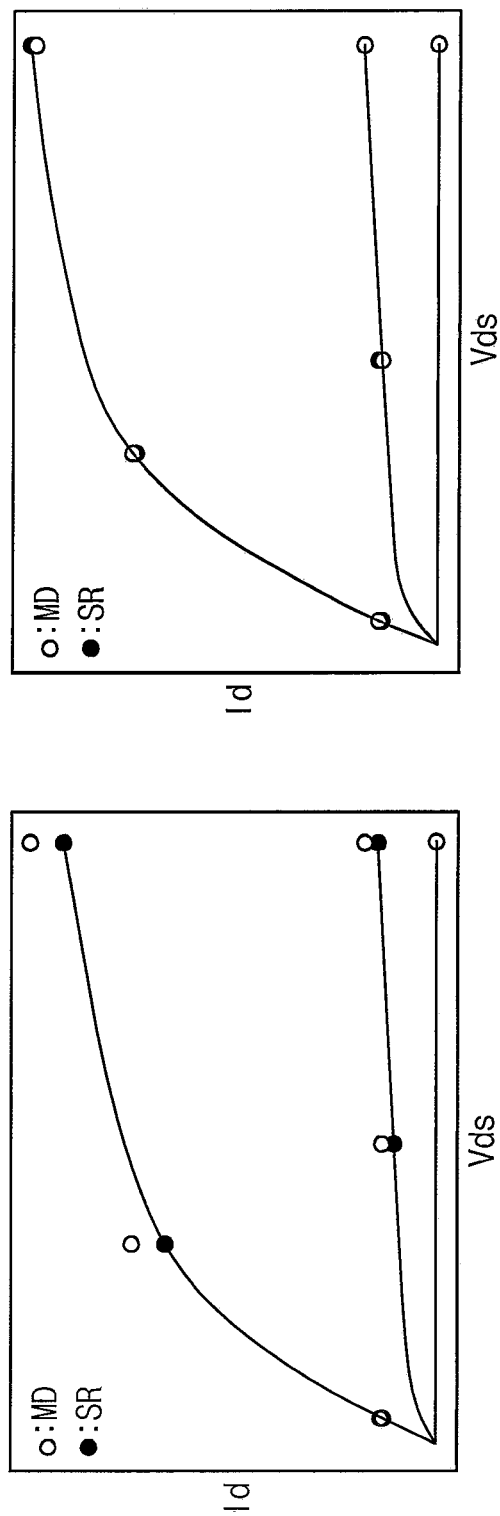

FIGS. 26, 27 and 28 are diagrams illustrating results of a method of generating a device model according to example embodiments to the reference points of FIG. 24.

Figure 29:
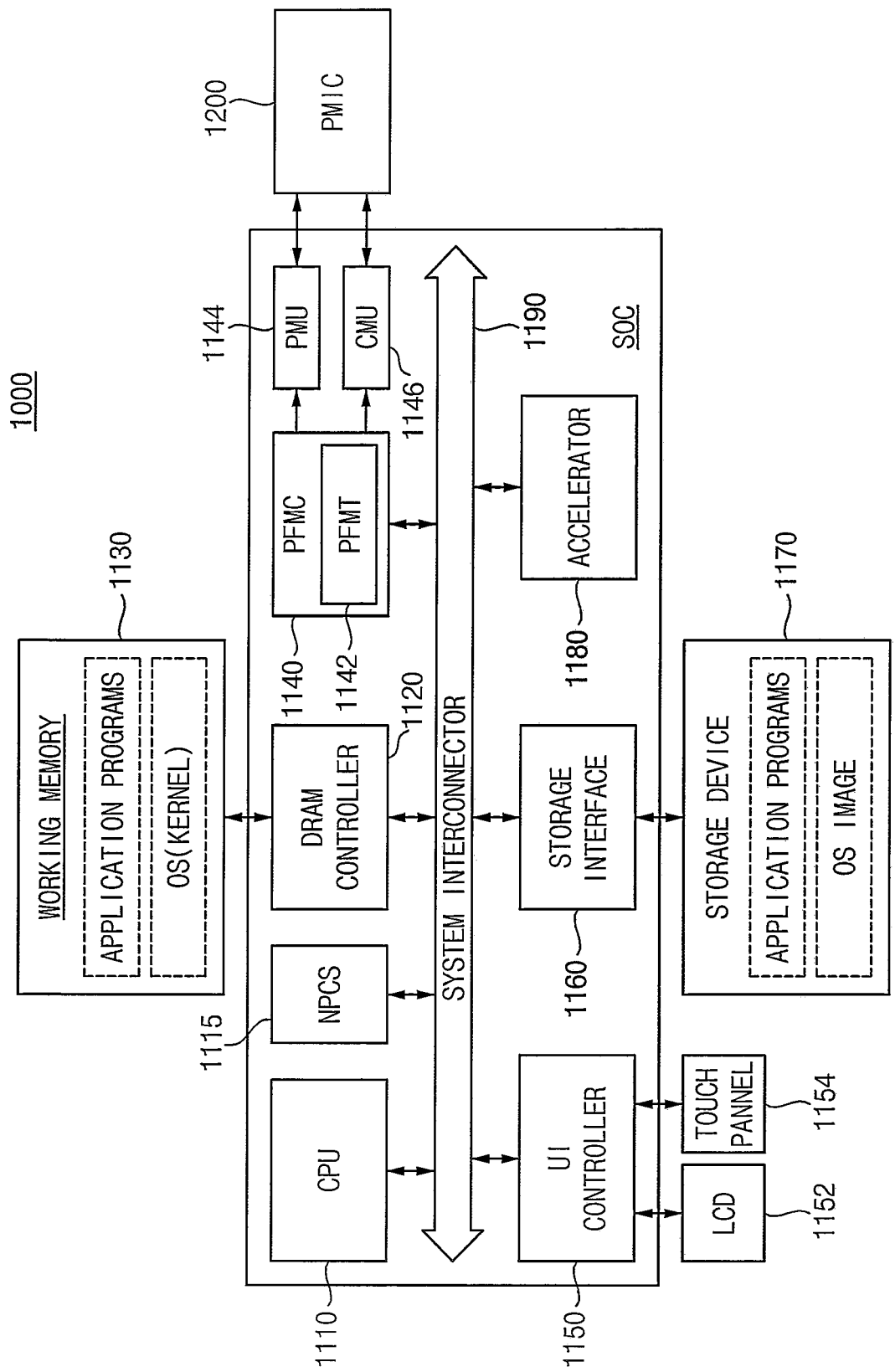
FIG. 29 is a block diagram illustrating a computing system according to some example embodiments.

FIG. 29 illustrates an example of the local minimum values that are obtained with respect to the six reference points in FIGS. 24 and 25 by the method of generating a device model according to example embodiments. In FIG.

26, the numbers 0-13 indicate serial numbers of fourteen different initial value sets. The local minimum values corresponding to each initial value set may include six feature local minimum values corresponding to the six reference points or the six device value sets. As illustrated in FIG. 26, the local minimum values may be changed if the initial value set for the reinforcement learning is changed.

The scale of the local minimum values may be different depending on the electrical targets ET or the target currents Idsat, Idsat2, Idmid, Idmid2, Idlin and Idoff. In this case, the optimal value determination unit OVDM in FIG. 10 may generate six normalized feature local minimum values by normalizing the six feature local minimum values, and with respect to each initial value set of the fourteen initial value sets, determine each local minimum value corresponding to each initial value set such that each local minimum value corresponds to a sum of the six normalized feature local minimum values. The optimal value determination unit OVDM may determine the selection local minimum value corresponding to the minimum value of the fourteen local minimum values, and determine the values of the target parameters corresponding to the selection local minimum value as the optimal values of the target parameters.

FIG. 27 illustrates the six selection global minimum values corresponding to the six electrical targets Idsat, Idsat2, Idmid, Idmid2, Idlin and Idoff, which are obtained by performing the reinforcement learning RL and the genetic algorithm GA based on the measurement data MD.

FIG. 28 illustrates comparison between the measurement data and the simulation result data SR of compact models that predict the drain current Id with the input of the drain-source voltage Vds. The left portion of FIG. 28 is the comparison result of a conventional compact model, and the right portion of FIG. 28 is the comparison result of a compact model generated by the method according to example embodiments. As illustrated in FIG. 28, the device model capable of precisely predicting characteristics of the semiconductor device may be provided by determining the parameters of the device model using the optimization scheme based on the reinforcement learning.

FIG. 29 is a block diagram illustrating a computing system according to some example embodiments.

Referring to FIG. 29, a computing system 1000 may include a system on chip (SoC), a working memory 1130, a display device (LCD) 1152, a touch panel 1154, a storage device 1170, a power management integrated circuit (PMIC) 1200, etc. The SoC may include a central processing unit (CPU) 1110, a neural processing control system NPCS 1115, a DRAM controller 1120, a performance controller 1140, a user interface controller (UI controller) 1150, a storage interface 1160, and an accelerator 1180, a power management unit (PMU) 1144, a clock management unit (CMU) 1146, etc. It will be understood that components of the computing system 1000 are not limited to the components shown in FIG. 17. For example, the computing system 1000 may further include a hardware codec for processing image data, a security block, and/or the like.

The processor 1110 executes software (for example, an application program, an operating system (OS), and device drivers) for computing system 1000. The processor 1110 may execute the operating system (OS) which may be loaded into the working memory 1130. The processor 1110 may execute various application programs to be driven on the operating system (OS). The processor 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The processor cores of the processor 1100 may be grouped into a plurality of clusters that operate with an independent driving clock and an independent driving voltage.

The processor cores in the same cluster may be included in a clock domain operating based on the same clock signal and/or in a power domain operating based on the same driving voltage. The driving voltage and/or the clock signal provided to each of the processor cores may be cut off or connected in units of single cores.

In some example embodiments, the neural processing control system 1115 may include the agent module and the environment module as described above.

A kernel of the operating system (OS) may monitor the number of tasks in a task queue and the driving voltage and the driving clock of the processor 1110 at specific time intervals to control the processor 1110. In addition, a kernel of the operating system (OS) may control hotplug-in or hotplug-out of the processor 1110 with reference to the monitored information.

The DRAM controller 1120 provides interfacing between the working memory 1130 and the system-on-chip (SoC). The DRAM controller 1120 may access the working memory 1130 according to a request of the processor 1110 or another intellectual property (IP) block.

The operating system (OS) (or basic application programs) may be loaded into the working memory 1130 during a booting operation. For example, an OS image stored in the storage device 1170 is loaded into the working memory 1130 based on a booting sequence during booting of the computing system 1000. Overall input/output operations of the computing system 1000 may be supported by the operating system (OS). The working memory 1130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 1140 may adjust operation parameters of the system-on-chip (SoC) according to a control request provided from the kernel of the operating system (OS). For example, the performance controller 1140 may adjust the level of dynamic voltage and frequency scaling (DVFS) to enhance performance of the system-on-chip (SoC). Alternatively, the performance controller 1140 may control the frequencies of the processor cores according to a request of the kernel. In this case, the performance controller 1140 may include a performance table 1142 to set a driving voltage and a frequency of a driving clock therein. The performance controller 1140 may control the PMU 1144 and the CMU 1146, which together form a power managing circuit, connected to the PMIC 1200 to provide the determined driving voltage and the determined driving clock to each power domain.

The user interface controller 1150 controls user input and output from user interface devices. For example, the user interface controller 1150 may display a keyboard screen for inputting data to the LCD 1152 according to the control of the processor 1110. Alternatively, the user interface controller 1150 may control the LCD 1152 to display data that a user requests. The user interface controller 1150 may decode data provided from user input means, such as a touch panel 1154, into user input data.

The storage interface 1160 accesses the storage device 1170 according to a request of the processor 1110. For example, the storage interface 1160 provides interfacing between the system-on-chip (SoC) and the storage device 1170. For example, data processed by the processor 1110 is stored in the storage device 1170 through the storage interface 1160. Alternatively, data stored in the storage device 1170 may be provided to the processor 1110 through the storage interface 1160.

The storage device 1170 is provided as a storage medium of the computing system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with a high-capacity storage capability. Alternatively, the storage device 1170 may include a next-generation nonvolatile memory such as PRAM, MRAM, ReRAM, and FRAM or a NOR-type flash memory.

The accelerator 1180 may be provided as a separate intellectual property (IP) component to increase processing speed of a multimedia or multimedia data. For example, the accelerator 1180 may be provided as an intellectual property (IP) component to enhance processing performance of a text, audio, still images, animation, video, two-dimensional data or three-dimensional data.

A system interconnector 1190 may be a system bus to provide an on-chip network in the system-on-chip (SoC). The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

Figure 30:
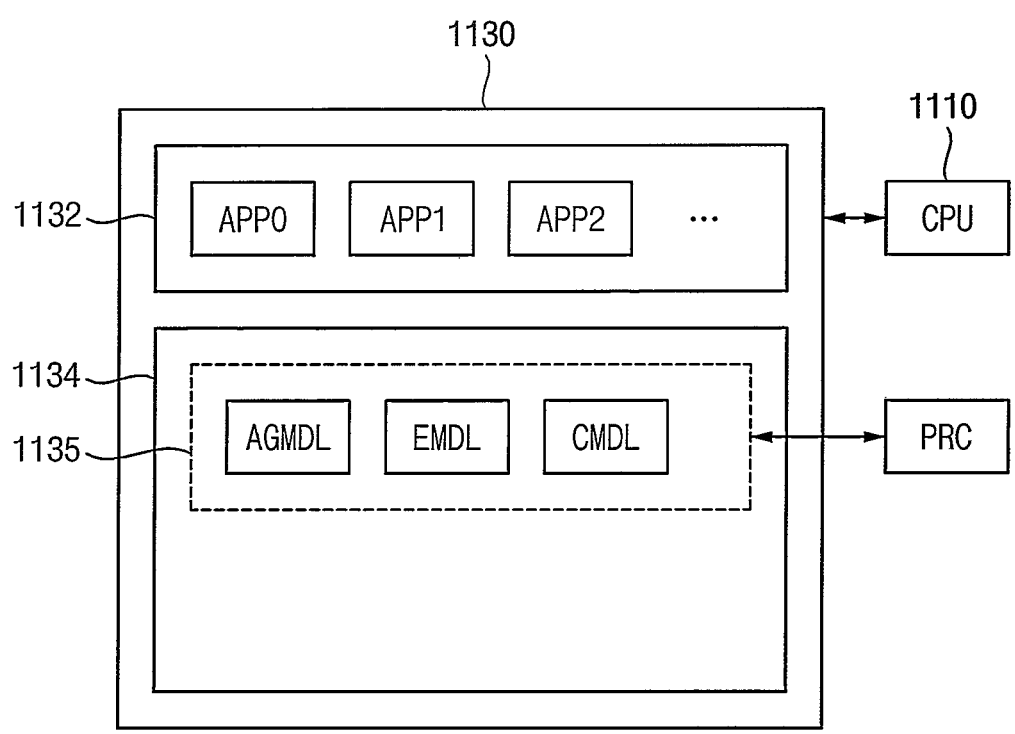
FIG. 30 is a diagram illustrating an example of a training control module implemented in the computing system of FIG. 29.

FIG. 30 is a diagram illustrating an example of a training control module implemented in the computing system of FIG. 29.

FIG. 30 illustrates an example software structure of the computing system 1000 shown in FIG. 29. Referring to FIG. 30, a software layer structure of the computing system 1000 loaded into the working memory 1130 and driven by the processor 1110 may be divided into an application program 1132 and a kernel 1134. The operating system (OS) may further include one or more device drivers to manage various devices such as a memory, a modem, and an image processing device.

The application program 1132 may be upper layer software driven as a basic service and/or driven by a user's request. A plurality of application programs APP0, APP1, and APP2 may be simultaneously executed to provide various services. The application programs APP0, APP1 and APP2 may be executed by the processor 1110 after being loaded into the working memory 1130.

The kernel 1134, as a component of the operating system (OS), performs a control operation between the application program 1132 and hardware. The kernel 1134 may include program execution, interrupt, multi-tasking, memory management, a file system, and a device driver.

According to some example embodiments, an agent module AGMDL, an environment module EMDL and a control module CMDL may be provided as a portion of the kernel 1134. The training control module including the agent module AGMDL, the environment module EMDL and the control module CMDL may be executed by a central processing unit (CPU) or another processor PRC.

As described above, the method of generating a device model and the computing system according to example embodiments may provide the device model capable of precisely predicting characteristics of the semiconductor device by determining the parameters of the device model using the optimization scheme based on the reinforcement learning. Through the enhanced prediction performance of the device model, the time and/or the cost of designing and/or manufacturing the semiconductor product including the semiconductor device and the performance of the semiconductor product may be enhanced.

In this disclosure, the functional blocks and/or the terms "driver," "unit," and/or "module" may denote elements that process (and/or perform) at least one function or operation and may be included in and/or implemented as and/or in processing circuitry such hardware, software, or the combination of hardware and software. For example, the processing circuitry more specifically may include (and/or be included in), but is not limited to, a processor (and/or processors), Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the term "module" may refer to a software component and/or a hardware component such as a field programmable gate array (FPGA) or an application specific integrated circuit (ASIC), and/or combination of a hardware component and a software component. However, a "module" is not limited to software or hardware. A "module" may be configured to be included in an addressable storage medium and/or to reproduce one or more processors. Accordingly, for example, a "module" may include components such as software components, object-oriented software components, class components, and task components, processes. functions, attributes, procedures, subroutines, segments of program code, drivers, firmware, microcode, circuits, data, databases, data structures, tables, arrays, and variables. A function provided in components and "modules" may be integrated with a smaller number of components and "modules" or divided into additional components and "modules."

As will be appreciated by one skilled in the art, embodiments of the inventive concept(s) described herein may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

The example embodiments may be applied to devices and systems performing neural processing. For example, the example embodiments may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of some example embodiments and is not to be construed as limiting thereof. Although a few example embodiments have been described, those skilled in the art will readily appreciate that many modifications are possible in the example embodiments without materially departing from the inventive concept(s) described herein.

What is claimed is:

1. A method of generating a device model configured to perform a simulation based on device data and output simulation result data indicating characteristics of a semiconductor device, the method being performed by at least one processor executing program codes, the method comprising:
   receiving measurement data obtained by measuring the characteristics of the semiconductor device;
   selecting at least one target parameter from a plurality of parameters of the device model configured to perform the simulation;
   selecting a plurality of initial value sets corresponding to different combinations of initial values of the at least one target parameter;
   determining a plurality of local minimum values based on reinforcement learning such that each of the plurality of local minimum values corresponds to a minimum value of a difference between the measurement data and the simulation result data with respect to each of the plurality of initial value sets; and
   determining improved values of the at least one target parameter based on the plurality of local minimum values.

2. The method of claim 1, wherein determining the improved values of the at least one target parameter includes:
   determining a selection local minimum value corresponding to a minimum value among the plurality of local minimum values; and
   determining values of the at least one target parameter corresponding to the selection local minimum value as the improved values.

3. The method of claim 1, wherein determining the improved values of the at least one target parameter includes:
   performing a genetic algorithm such that a plurality of global minimum values equal to or smaller than the plurality of local minimum values is determined;
   determining a selection global minimum value corresponding to a minimum value among the plurality of global minimum values; and
   determining values of the at least one target parameter corresponding to the selection global minimum value as the improved values.

4. The method of claim 1, wherein, with respect to each initial value set of the plurality of initial value sets, each local minimum value corresponding to each initial value set is determined by changing values of at least one target parameter starting from each initial value set based on the reinforcement learning.

5. The method of claim 4, wherein one local minimum value corresponding to one initial value set is different from another local minimum value corresponding to another initial value set.

6. The method of claim 1, wherein determining the plurality of local minimum values includes:
   repeatedly performing an iteration to determine a next action based on a reward value corresponding to a present action with respect to each initial value set of the plurality of initial value sets;
   generating the reward value based on values of the at least one target parameter corresponding to the present action; and
   determining each local minimum value corresponding to each initial value set based on a change of the reward value according to repeatedly performed iterations.

7. The method of claim 6, wherein the reward value is increased as the difference between the measurement data and the simulation result data is decreased.

8. The method of claim 1, wherein determining the plurality of local minimum values includes:
   repeatedly performing an iteration to determine a next action among a plurality of candidate actions based on a reward value and a plurality of Q values corresponding to a present action among the plurality of candidate actions with respect to each initial value set of the plurality of initial value sets, the plurality of candidate actions indicating change of values of the at least one target parameter;
   generating the reward value and the plurality of Q values based on values of the at least one target parameter corresponding to the present action, the plurality of Q values indicating prediction reward values of the plurality of candidate actions; and
   determining each local minimum value corresponding to each initial value set based on a change of the reward value according to repeatedly performed iterations.

9. The method of claim 1, further comprising:
   selecting a plurality of device value sets corresponding to different combinations of values of the device data,
   wherein determining the plurality of local minimum values includes
      determining a plurality of feature local minimum values respectively corresponding to the plurality of device value sets with respect to each initial value set of the plurality of initial value sets, and
      determining each local minimum value corresponding to each initial value set based on the plurality of feature local minimum value.

10. The method of claim 9, further comprising:
    generating a plurality of normalized feature local minimum values by normalizing the plurality of feature local minimum values; and
    determining each local minimum value corresponding to each initial value set such that each local minimum value corresponds to a sum of the plurality of normalized feature local minimum values with respect to each initial value set of the plurality of initial value sets.

11. A method of generating a device model configured to perform a simulation based on device data and output simulation result data indicating characteristics of a semiconductor device, the method being performed by at least one processor executing program codes, the method comprising:
    receiving measurement data obtained by measuring characteristics of the semiconductor device;

selecting at least one target parameters among a plurality of parameters of the device model configured to perform the simulation;

selecting a plurality of initial value sets corresponding to different combinations of initial values of the at least one target parameter;

determining a plurality of local minimum values based on reinforcement learning such that each of the plurality of local minimum values corresponds to a minimum value of a difference between the measurement data and the simulation result data with respect to each of the plurality of initial value sets;

performing a genetic algorithm such that a plurality of global minimum values equal to or smaller than the plurality of local minimum values is determined; and determining improved values of the at least one target parameter based on the plurality of global minimum values.

12. The method of claim 11, wherein determining the improved values of the target parameters includes:

determining a selection global minimum value corresponding to a minimum value among the plurality of global minimum values; and determining values of the at least one target parameter corresponding to the selection global minimum value as the improved values.

13. The method of claim 11, wherein, with respect to each initial value set of the plurality of initial value sets, each local minimum value corresponding to each initial value set is determined by changing values of the at least one target parameter starting from each initial value set based on the reinforcement learning.

14. A computing device comprising:

a computer readable medium storing program codes including a training control module configured to train a device model, the device model configured to perform a simulation based on device data and output simulation result data indicating characteristics of a semiconductor device; and at least one processor configured to, by executing the training control module, receive measurement data obtained by measuring the characteristics of the semiconductor device;

select at least one target parameter among a plurality of parameters of the device model;

select a plurality of initial value sets corresponding to different combinations of initial values of the at least one target parameter;

determine a plurality of local minimum values based on reinforcement learning such that each of the plurality of local minimum value corresponds to a minimum value of a difference between the measurement data and the simulation result data with respect to each of the plurality of initial value sets; and determine improved values of the at least one target parameters based on the plurality of local minimum values.

15. The computing device of claim 14, wherein the training control module includes:

a control module configured to select the at least one target parameter and the plurality of initial value sets and to determine the improved values of the target parameters; and a reinforcement learning module configured to perform the reinforcement learning to determine the plurality of local minimum values.

16. The computing device of claim 15, wherein the reinforcement learning module is configured to:

repeatedly perform an iteration, with respect to each initial value set of the plurality of initial value sets, to determine a next action among a plurality of candidate actions based on a reward value and a plurality of Q values corresponding to a present action among the plurality of candidate actions, the plurality of candidate actions indicating change of values of the target parameters; and generate the reward value and the plurality of Q values based on values of the target parameters corresponding to the present action, the plurality of Q values indicating prediction reward values of the plurality of candidate actions.

17. The computing device of claim 16, wherein the reinforcement learning module is further configured to:

determine whether a condition of each of the plurality of local minimum values corresponding to each of the plurality of initial value sets is satisfied; and provide a present local minimum value and values of the target parameter corresponding to the present action to the control module when the condition is satisfied.

18. The computing device of claim 15, wherein the reinforcement learning module is further configured to:

determine a selection local minimum value corresponding to a minimum value among the plurality of local minimum values; and determining values of the at least one target parameter corresponding to the selection local minimum value as the improved values.

19. The computing device of claim 15, wherein the program codes further include:

a genetic algorithm module configured to perform a genetic algorithm to determine a plurality of global minimum values equal to or smaller than the plurality of local minimum values.

20. The computing device of claim 19, wherein the control module is configured to:

determine a selection global minimum value corresponding to a minimum value among the plurality of global minimum values; and determine values of the at least one target parameter corresponding to the selection global minimum value as the improved values.

* * * * *